US011682234B2

(12) United States Patent
Hu et al.

(10) Patent No.: US 11,682,234 B2
(45) Date of Patent: Jun. 20, 2023

(54) TEXTURE MAP GENERATION USING MULTI-VIEWPOINT COLOR IMAGES

(71) Applicants: SONY GROUP CORPORATION, Tokyo (JP); Sony Corporation of America, New York, NY (US)

(72) Inventors: Jie Hu, San Jose, CA (US); Mohammad Gharavi-Alkhansari, San Jose, CA (US)

(73) Assignees: SONY GROUP CORPORATION, Tokyo (JP); SONY CORPORATION OF AMERICA, New York, NY (US)

(*) Notice: Subject to any disclaimer, the term of this patent is extended or adjusted under 35 U.S.C. 154(b) by 176 days.

(21) Appl. No.: 17/124,684

(22) Filed: Dec. 17, 2020

(65) Prior Publication Data

US 2021/0209347 A1  Jul. 8, 2021

Related U.S. Application Data

(60) Provisional application No. 62/956,419, filed on Jan. 2, 2020.

(51) Int. Cl.
*G06K 9/00* (2022.01)
*G06V 40/16* (2022.01)
(Continued)

(52) U.S. Cl.
CPC ............ *G06V 40/176* (2022.01); *G06F 3/011* (2013.01); *G06T 15/04* (2013.01); *G06T 17/00* (2013.01); *G06V 20/64* (2022.01)

(58) Field of Classification Search
CPC .......... G06F 3/011; G06T 15/04; G06T 17/00
See application file for complete search history.

(56) References Cited

U.S. PATENT DOCUMENTS 8,861,800 B2    10/2014  Savvides et al.
2009/0310828 A1*  12/2009  Kakadiaris ........... G06V 40/168
                                                      382/118
(Continued)

FOREIGN PATENT DOCUMENTS

EP        1890263 A2     2/2008

OTHER PUBLICATIONS

Suwajanakorn, et al., "Total Moving Face Reconstruction", European Conference on Computer Vision (ECCV), 2014, 17 pages.
(Continued)

*Primary Examiner* — Terrell M Robinson
(74) *Attorney, Agent, or Firm* — Chip Law Group

(57) ABSTRACT

An electronic device and method for texture map generation are disclosed. A set of color images from a set of viewpoints and depth information of a subject's face are acquired. A 3D model is generated based on a color image and the depth information. A set of viewpoint-specific projections of the 3D model are generated along the set of viewpoints. The 3D model is refined based on minimization of difference between each viewpoint-specific projection and a corresponding color image. A set of texture maps corresponding to the set of viewpoints is generated, based on the refined 3D model, and set of color images. A dynamic programming workflow is executed to determine seams along which respective portions of the set of texture maps are to be stitched and the respective portions are stitched along the seams to generate a final texture map for the refined 3D model of the subject's face.

18 Claims, 15 Drawing Sheets

(51) Int. Cl.
*G06T 15/04* (2011.01)
*G06F 3/01* (2006.01)
*G06T 17/00* (2006.01)
*G06V 20/64* (2022.01)

(56) References Cited

U.S. PATENT DOCUMENTS

| | | | |
|---|---|---|---|
| 2014/0043329 A1 | 2/2014 | Wang et al. | |
| 2014/0160123 A1* | 6/2014 | Yang | G06T 17/00 345/420 |
| 2015/0363665 A1* | 12/2015 | Szasz | G06V 10/44 382/203 |
| 2017/0148212 A1* | 5/2017 | Goel | G06T 17/205 |
| 2018/0046854 A1* | 2/2018 | Kittler | G06V 40/172 |
| 2018/0253593 A1 | 9/2018 | Hu et al. | |

OTHER PUBLICATIONS

Zhu, et al., "High-fidelity Pose and Expression Normalization for Face Recognition in the Wild", IEEE, Conference on Computer Vision and Pattern Recognition (CVPR), Oct. 15, 2015, pp. 787-796.

Hwang, et al., "3D Face Modeling Using the Multi-Deformable Method", Sensors, vol. 12, No. 10, December Sep. 25, 2012, pp. 12870-12889.

* cited by examiner

TEXTURE MAP GENERATION USING MULTI-VIEWPOINT COLOR IMAGES

REFERENCE

This application claims priority to U.S. Provisional Patent Application Ser. No. 62/956,419 filed on Jan. 2, 2020, the entire content of which is hereby incorporated herein by reference.

FIELD

Various embodiments of the disclosure relate to three-dimensional (3D) modeling and virtual human modelling. More specifically, various embodiments of the disclosure relate to an electronic device and method for texture map generation using multi-viewpoint color images.

BACKGROUND

Advancements in the field of three-dimensional (3D) computer graphics have provided the ability to create 3D models and visualize real objects in a 3D computer graphics environment. 3D content, such as a 3D character model, is increasingly used in animated movies, games, and virtual-reality systems to enhance user experience. A 3D model is a static 3D mesh that resembles the shape of a particular object. Typically, such a 3D model is manually designed by computer graphics artists, commonly known as modelers, by use of a modeling software application. Such a 3D model may not be used in the same way in animation, or various virtual reality systems or applications.

Texture mapping is an important method of defining texture details to be applied on the 3D model to texture the 3D model. Creating a realistic model and a texture map has been a difficult problem in fields of computer graphics and computer vision. With increasing applications in areas of virtual reality, 3D human avatar, 3D gaming, and virtual simulation, generating accurate texture maps and imparting photorealism to a 3D model has become increasingly important.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for texture map generation using multi-viewpoint color images is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic device and method for texture map generation using multi-viewpoint color images. Exemplary aspects of the disclosure may include the electronic device and method to model a 3D face using multiple calibrated high-resolution cameras. All such cameras may capture images from several viewpoints, such as a front, a front-left, and a front-right view of the face and a depth sensor may be aligned with one of cameras to acquire depth information of the face. An initial 3D face model may be constructed using color and depth information (i.e. RGBD) acquired from one of the cameras (such as a central RGB camera) and the depth sensor. The images from all such cameras may be used to refine the initial 3D model. The final texture map of the face may be obtained by stitching the effective region of the texture maps generated from images acquired from such cameras. The projection of the 3D model on multiple image planes may be based on perspective projection. The refinement of the shape model using RGB images may be based on a 3D flow refinement, which may optimize the offset for each vertex of the 3D model by minimizing the difference between the projected face models on 2D plane and the input images. The seam for stitching multiple texture maps may be determined by dynamic programming using the energy calculated from the texture map generated from the 3 calibrated cameras.

In conventional methods, the RGBD input may be acquired from a single (frontal) view and no information from the side may be involved. The shape reconstruction may only refer to an existing parametric model, which may not well represent the real shape of the face. Similarly, for texture map generation, texture obtained from a single frontal view and the texture obtained from parametric model fitting may fail to provide a high-resolution and correct texture for sides of the face. In contrast, the present disclosure may provide a new camera set up, which uses the RGBD camera at the center and RGB cameras at sides to reconstruct the face and uses the RGB images from all such cameras to refine the shape model and generate the high resolution texture map (i.e. the final texture map for the face). The 3D flow shape refinement may be first extended to perspective projection to deal with multiple reference images. A new dynamic programming-based approach may be implemented on the electronic device to determine seams along which texture maps generated from multiple images may be stitched to obtain the final texture map. The final texture map may capture texture with a higher accuracy and with improved quality as compared with that from the conventional methods.

Figure 1:
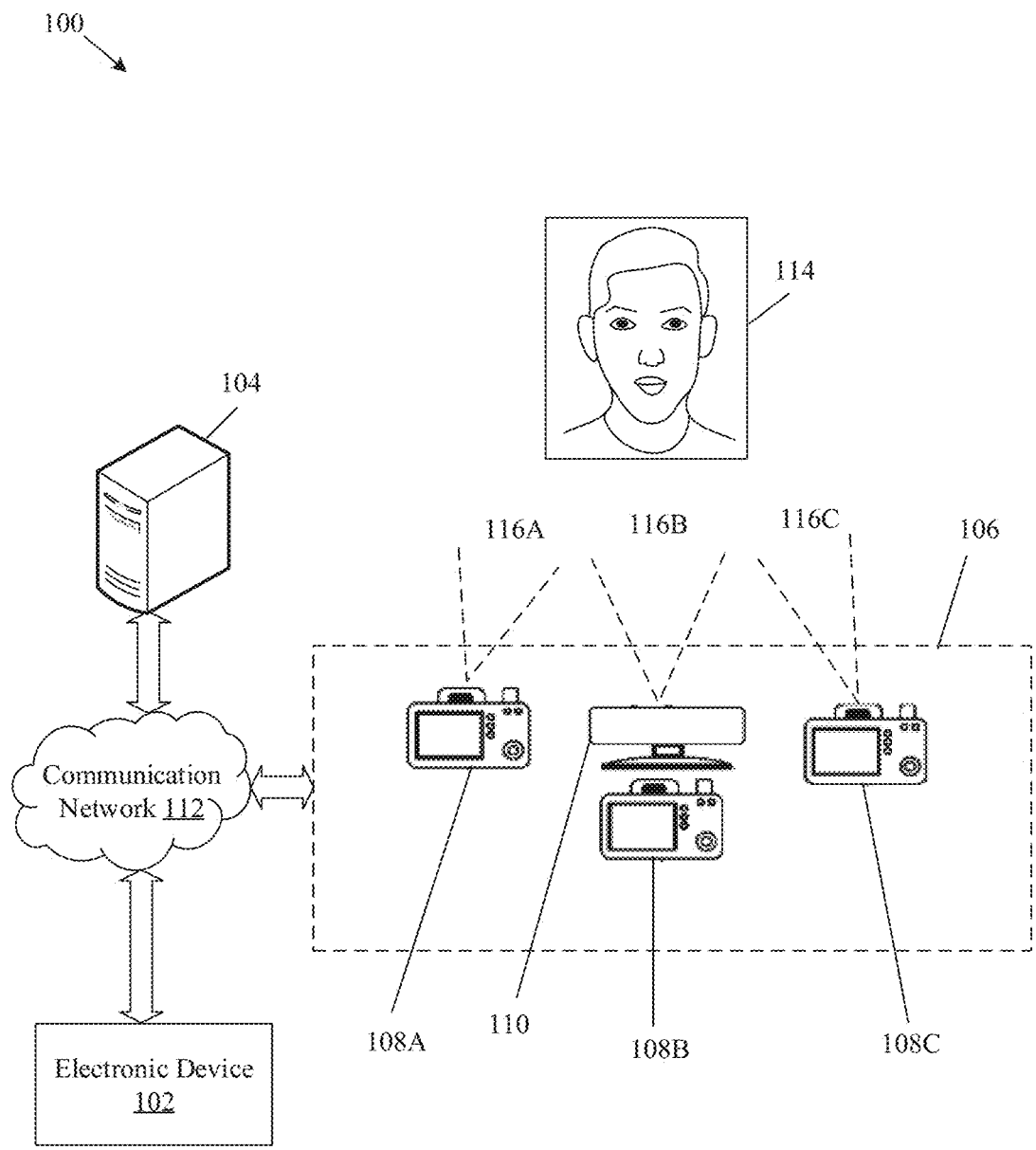
FIG. 1 is a block diagram that illustrates an exemplary network environment for texture map generation by use of multi-viewpoint color images, in accordance with an embodiment of the disclosure.

FIG. 1 is a block diagram that illustrates an exemplary network environment for texture map generation by use of multi-viewpoint color images, in accordance with an embodiment of the disclosure. With reference to FIG. 1, there is shown a network environment 100. The network environment 100 may include an electronic device 102, a server 104, a sensing device 106, and a communication network 112. The sensing device 106 may include a set of image sensors and a depth sensor 110. The set of image sensors may include a first image sensor 108A, a second image sensor 108B, and a third image sensor 108C. In FIG. 1, there is further shown a subject's face 114 that may be scanned by the sensing device 106. The electronic device 102 may be communicatively coupled to the server 104 and the sensing device 106, via the communication network 112.

In FIG. 1, the three image sensors 108A, 108B, and 108C are presented merely as an example and should not be construed as limiting for the disclosure. The set of image sensors may include two or more than three image sensors, without deviation from the scope of the disclosure. Also, the position, orientation and/or arrangement of the image sensors 108A, 108B, 108C, as shown in FIG. 1, are presented merely as an example and should not be construed as limiting for the disclosure. The present disclosure may be applicable to other positions, orientations, and/or arrangements of the image sensors 108A, 108B, 108C, without a deviation from the scope of the disclosure. Similarly, relative to the image sensors 108A, 108B, and 108C, the position and the orientation of the depth sensor 110, as shown in FIG. 1, are shown merely as an example, and should not be construed as limiting the disclosure. The present disclosure may be applicable to other positions or orientations of the depth sensor 110, without deviation from the scope of the disclosure.

In FIG. 1, the server 104 and the sensing device 106 are shown as two entities which are separate from the electronic device 102. In some embodiments, some or all of the functionalities of the server 104 and/or the sensing device 106 may be incorporated in the electronic device 102, without a deviation from the scope of the present disclosure.

The electronic device 102 may include suitable logic, circuitry, interfaces, and/or code that may be configured to generate a texture map of a face of a subject from multiple color images associated with multiple viewpoints. The texture map of the face may include texture information associated with the face of the subject. Examples of the electronic device 102 may include, but are not limited to, a computing device, a video-conferencing system, an augmented reality-based device, a gaming device, a mainframe machine, a server, a computer work-station, and/or a consumer electronic (CE) device.

The server 104 may include suitable circuitry, interfaces, and/or code that may be configured to store a 3D morphable model, which may include a 3D mean-shape model and a plurality of shape components. The 3D morphable model may be obtained by application of dimensionality reduction (such as principle component analysis (PCA)) on a set of reference face meshes. For example, the server 104 may store the 3D mean-shape model of a reference 3D face in a neutral expression and the plurality of shape components as a part of the stored 3D morphable model. The server 104 may be configured to also store a plurality of arbitrary facial expressions related to the 3D mean-shape model. Examples of the server 104 may include, but are not limited to, an application server, a cloud server, a web server, a database server, a file server, a gaming server, a mainframe server, or a combination thereof.

The sensing device 106 may include suitable logic, circuitry, interfaces, and/or code that may be configured to capture a set of color images of the subject's face 114 from a set of viewpoints and depth information of the subject's face 114 from one of the set of viewpoints (or from a viewpoint which may be different from the set of viewpoints). The sensing device 106 may be configured to transmit the captured set of color images and the depth information to the electronic device 102, via the communication network 112. The sensing device 106 may include a plurality of sensors, such as a combination of a depth sensor, a color sensor, (such as a red-green-blue (RGB) sensor), and/or an infrared (IR) sensor which may capture the subject's face 114 from a particular viewpoint. Example implementations of the sensing device 106 may include, but are not limited to, a depth sensor, a Light Detection and Ranging (LiDAR), a Time-of-Flight (ToF) sensor, a sensor which implements Structure-from-motion (SfM), an IR sensor, an image sensor, a structured-light 3D scanner, a handheld laser scanner, a modulated light 3D scanner, a stereoscopic camera, a camera array, and/or a combination thereof.

In one embodiment, the sensing device 106 may be implemented as a component of the electronic device 102.

Each of the set of image sensors (i.e., image sensors 108A, 108B, and 108C) may include suitable logic, circuitry, and interfaces that may be configured to capture the set of color images of the subject's face 114 from the set of viewpoints. For example, the first image sensor 108A may capture a first color image from a first viewpoint 116A, the second image sensor 108B may capture a second color image from a second viewpoint 116B, and the third image sensor 108C may capture a third color image from a third viewpoint 116C. Each of the image sensors 108A, 108B, 108C may be pre-calibrated. Further, the operations of the image sensors 108A, 108B, and 108C may be synchronized such that the first color image, the second color image, and the third color image are captured concurrently. Examples of each of the image sensors 108A, 108B, and 108C may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

The depth sensor 110 may include suitable logic, circuitry, and interfaces that may be configured to capture the depth information of the subject's face 114 from one of the set of viewpoints, such as the second viewpoint 116B. The depth sensor 110 may be positioned at a distance (e.g., a few centimeters) above or below a certain image sensor (e.g., the second image sensor 108B). Further, the depth sensor 110 may be pre-calibrated and synchronized with the corresponding image sensor (e.g., the second image sensor 108B) to capture the depth information from a particular viewpoint (e.g., the second viewpoint 116B). Examples of the depth sensor 110 may include, but are not limited to, a stereo camera-based sensor, a ToF depth sensor, a Light Detection And Ranging (LiDAR)-based depth sensor, a Radio Detection And Ranging (RADAR)-based depth sensor, an ultrasonic depth sensor, and/or other depth/proximity sensors.

The communication network 112 may include a communication medium through which the electronic device 102 may communicate with the server 104 and the sensing device 106. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN), a mobile wireless network, such as a Long-Term Evolution (LTE) network (for example, 4th Generation or 5th Generation (5G) mobile network (i.e. 5G New Radio)). Various devices of the network environment 100 may be configured to connect to the communication network 112, in accordance with various wired or wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, Bluetooth (BT) communication protocols, or a combination thereof.

In operation, the sensing device 106 may be configured to capture a set of color images of the subject's face 114 from a set of viewpoints and depth information of the subject's face 114 from one of the set of viewpoints (or from a viewpoint which may be different from the set of viewpoints). For example, each of the image sensors 108A, 108B, and 108C may capture an RGB color image of the subject's face 114 from a set of viewpoints, such as viewpoints 116A, 116B, and 116C, respectively. The depth sensor 110 may capture depth information corresponding to an RGB color image of the subject's face 114 from one of the set of viewpoints. In an embodiment, the depth sensor 110 may be associated with the second image sensor 108B and may capture the depth information corresponding to the RGB color image of the subject's face 114 from the second viewpoint 116B. Together, the sensing device 106 may capture two RGB color images and an RGB-Depth (RGBD) image of the subject's face 114 from the set of viewpoints. The sensing device 106 may be configured to transmit the captured set of color images and the depth information of the subject's face 114, to the electronic device 102, via the communication network 112. In an embodiment, the electronic device 102 may acquire the set of color images of the subject's face 114 and the depth information of the subject's face 114 from the sensing device 106.

The electronic device 102 may be configured to generate a 3D model of the subject's face 114 based on at least a first color image of the acquired set of color images and the acquired depth information. The electronic device 102 may be further configured to generate a set of viewpoint-specific projections of the generated 3D model along the set of viewpoints. Thereafter, the electronic device 102 may refine the generated 3D model based on minimization of a difference between each viewpoint-specific projection of the generated set of viewpoint-specific projections and a corresponding color image of the acquired set of color images.

The electronic device 102 may be configured to generate a set of texture maps corresponding to the set of viewpoints, based on the refined 3D model and the acquired set of color images. The electronic device 102 may execute a dynamic programming workflow to determine seams along which respective portions of the generated set of texture maps are to be stitched. Once determined, the electronic device 102 may stitch the respective portions of the generated set of texture maps along the determined seams to generate a final texture map for the refined 3D model of the subject's face 114. Various operations of the electronic device 102 for texture map generation using multi-viewpoint color images are described further, for example, in FIGS. 3, 4A, 4B, 4C, 4D, 5A, 5B, 6, 7A, 7B, 7C, 8, 9A, 9B, 9C, 9D, 9E, 10, and 11.

Figure 2:
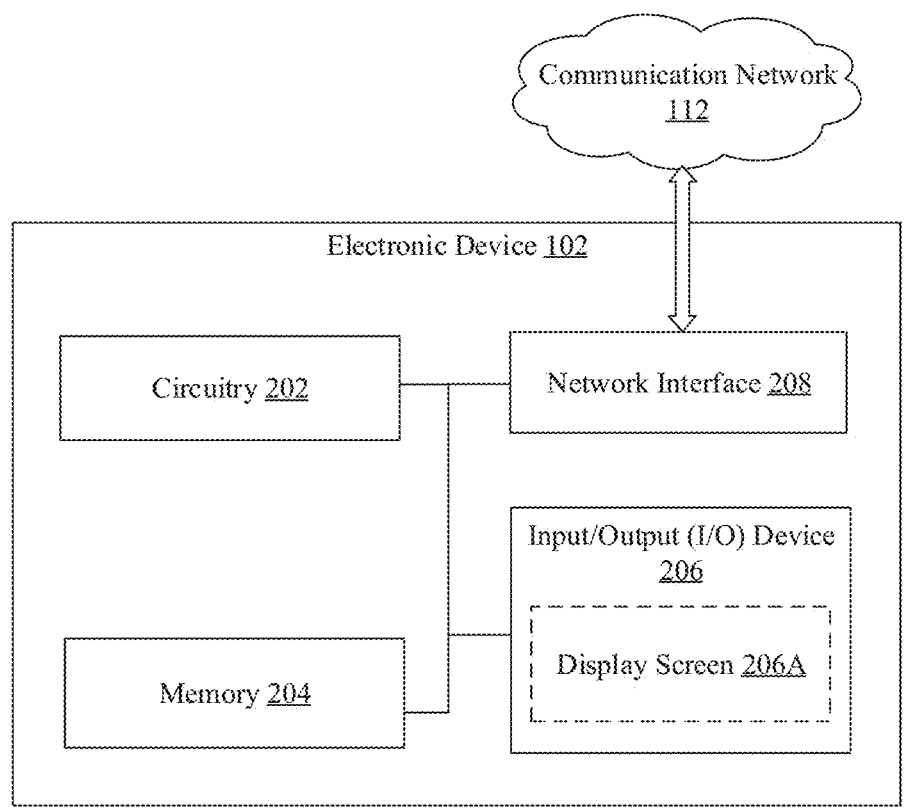
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may include circuitry 202, a memory 204, an input/output (I/O) device 206, and a network interface 208. The I/O device 206 may include a display screen 206A. The circuitry 202 may be communicatively coupled to the memory 204, the I/O device 206, and the network interface 208. The circuitry 202 may be configured to communicate with the server 104 and the sensing device 106, by use of the network interface 208.

The circuitry 202 may include suitable logic, circuitry, and interfaces that may be configured to execute program instructions associated with different operations to be executed by the electronic device 102. The circuitry 202 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

The memory 204 may include suitable logic, circuitry, and/or interfaces that may be configured to store a set of instructions executable by the circuitry 202. The memory 204 may be configured to store operating systems and associated applications. In accordance with an embodiment, the memory 204 may be also configured to store the acquired set of color images and the acquired depth information of the subject's face 114. Further, the memory 204 may also store the generated 3D model of the subject's face 114, the generated set of viewpoint-specific projections, the refined 3D model, and the generated set of texture maps. The memory 204 may also store data structures associated with the dynamic programming workflow. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input from a user. For example, the I/O device 206 may be configured to receive a user-input associated with a range of selection for seams in a layout for the final texture map. The I/O device 206 may be also configured to provide an output to the user. For example, as part of the I/O device 206, the display screen 206A may output the final texture map of the subject's face 114 and/or a 3D model onto which the final texture map may be applied. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display screen 206A and/or a speaker.

The display screen 206A may include suitable logic, circuitry, interfaces, and/or code that may be configured to render an application interface to display the final texture map of the subject's face 114. In accordance with an embodiment, the display screen 206A may be a touch screen, where input from the user may be received via the application interface. The display screen 206A may capture the input based on an input received from the user. The user may be able to provide inputs by activating and/or interacting with one or more of a plurality of buttons or UI elements displayed on the touch screen. In accordance with an embodiment, the display screen 206A may receive the input through a virtual keypad, a stylus, a gesture-based input, and/or a touch-based input. The display screen 206A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display screen 206A may refer to a display screen of smart-glass device, a see-through display, a projection-based display, an electro-chromic display, and/or a transparent display.

The network interface 208 may include suitable logic, circuitry, code, and/or interfaces that may be configured to facilitate communication among the circuitry 202, the server 104, and the sensing device 106, via the communication network 112. The network interface 208 may be implemented by use of various known technologies to support wired or wireless communication of the electronic device 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), a 5th generation network such as 5G new radio (NR) network, a 5G smart antenna, time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The network interface 208 may be capable to communicate with a 5G communication network and will include appropriate 5G support functionality such as, but not limited to, a 5G NR, a V2X Infrastructure, and a 5G Smart Antenna. Various operations of the circuitry 202 for texture map generation using multi-viewpoint color images are described further, for example, in FIGS. 3, 4A, 4B, 4C, 4D, 5A, 5B, 6, 7A, 7B, 7C, 8, 9A, 9B, 9C, 9D, 9E, 10, and 11.

Figure 3:
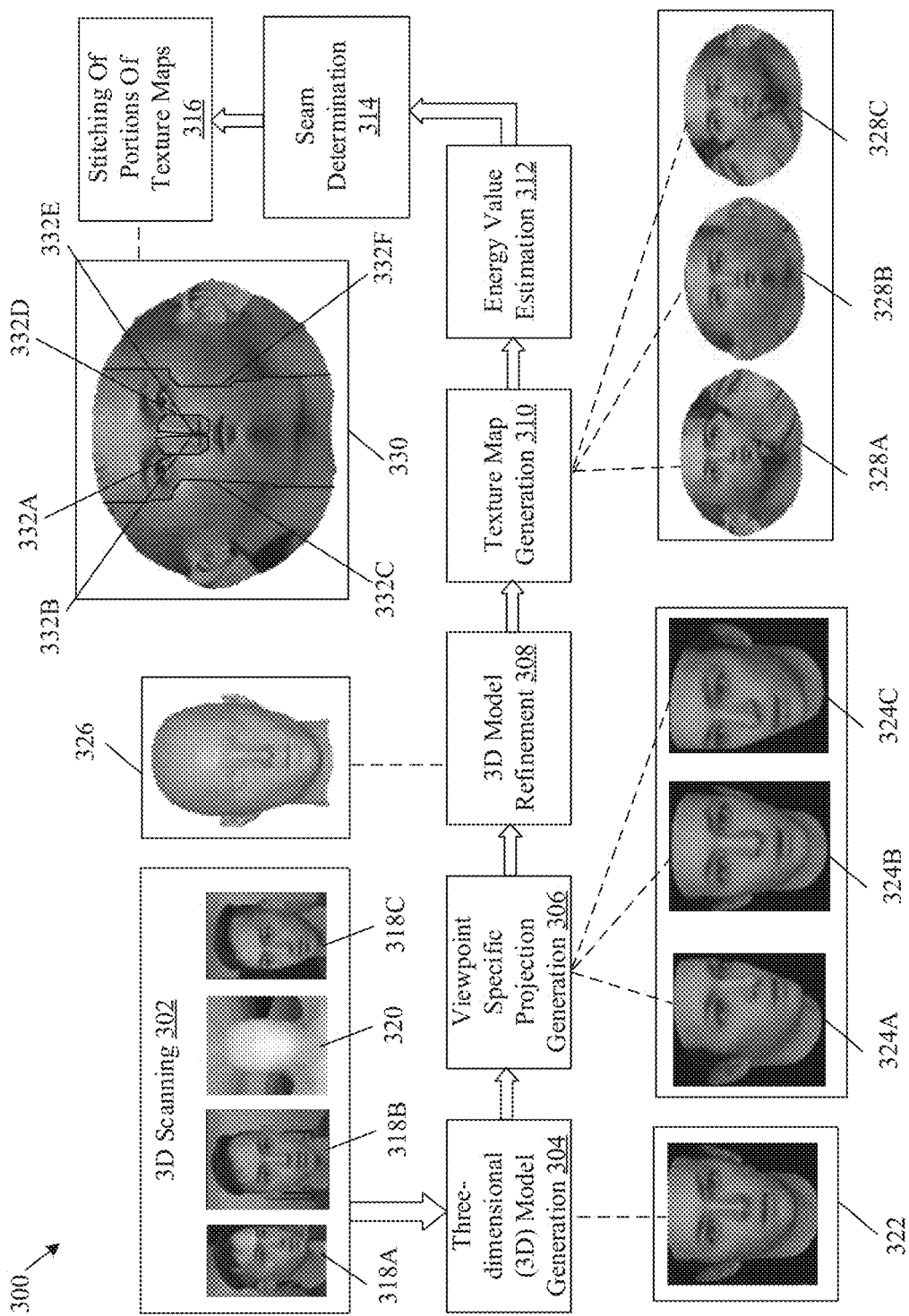
FIG. 3 is a diagram that illustrates an exemplary processing pipeline for texture map generation using multi-viewpoint color images, in accordance with an embodiment of the disclosure.

FIG. 3 is a diagram that illustrates an exemplary processing pipeline for texture map generation using multi-viewpoint color images, in accordance with an embodiment of the disclosure. FIG. 3 is explained in conjunction with elements from FIG. 1 and FIG. 2. With reference to FIG. 3, there is shown a processing pipeline of operations from 302 to 316 to depict texture map generation using multi-viewpoint color images. The circuitry 202 may execute the operations from 302 to 316.

At 302, a 3D scan of the subject's face 114 may be executed. In an embodiment, the sensing device 106 may be configured to execute the 3D scan of the subject's face 114. For the 3D scan, the set of image sensors of the sensing device 106 may capture a set of color image of the subject's face 114 from a set of viewpoints. For example, the first image sensor 108A may capture a first color image 318A from the first viewpoint 116A. Further, the second image sensor 108B may capture a second color image 318B from the second viewpoint 116B and the third image sensor 108C may capture a third color image 318C from the third viewpoint 116C. As shown, for example, the first viewpoint 116A and the third viewpoint 116C may correspond to non-frontal head poses at +30 degrees yaw axis and at −30 degrees yaw axis, respectively. The second viewpoint 116B may correspond to a frontal head pose (such as at 0-degree yaw axis) of the subject's face 114. Each of the color images 318A, 318B, and 318C may include color information, 2D position information, and texture information of objects in a 3D space, from the respective viewpoints 116A, 116B, and 116C.

The depth sensor 110 of the sensing device 106 may capture depth information 320 of the subject's face 114. The depth information 320 may be represented as a depth map or a depth image. For each depth value in the captured depth information 320, there may be a corresponding pixel in the second color image 318B of the subject's face 114. The captured depth information 320 of the subject's face 114 may include information about "Z" coordinates of the subject's face 114. For example, an amount of protrusion, such as a mole, protuberance of a nose, a depth of cheek region with respect to a forehead region, and depths of other regions of the subject's face 114 may not be estimated with accuracy without the depth information 320 of each region of the subject's face 114.

In an embodiment, the second color image 318B and the depth information 320 may be aligned with each other such that both the second color image 318B and the depth information 320 correspond to a common viewpoint (i.e., the second viewpoint 116B, such as a front view of the face). The alignment of the second color image 318B and the depth information 320 may be done by use of a suitable alignment method (which may be known to one skilled in the art). While the second color image 318B may determine 2D position and texture of points sampled from the subject's face 114, the depth information 320 may add depth or z-values to such points.

The sensing device 106 may be configured to transmit the set of color images (i.e., the color images 318A, 318B, and 318C) and the depth information 320 of the subject's face 114 to the electronic device 102, via the communication network 112. Alternatively, the circuitry 202 may acquire the set of color images (i.e., the color images 318A, 318B, and 318C) and the depth information 320 from the sensing device 106. For example, in a scenario where the sensing device 106 is implemented as a component of the electronic device 102, the circuitry 202 may acquire the set of color images (i.e., the color images 318A, 318B, and 318C) and the depth information 320 from the sensing device 106.

At 304, a three-dimensional (3D) model may be generated. In an embodiment, the circuitry 202 may be configured to generate the 3D model of the subject's face 114 based on at least one color image of the set of color images and the depth information 320. As an example, the second color image 318B from a frontal viewpoint (e.g., the second viewpoint 116B) may be used to generate the 3D model. In an embodiment, to generate the 3D model, the circuitry 202 may first generate a point cloud based on the second color image 318B and the depth information 320. For example, a bounding box may be detected around the subject's face 114 in the second color image 318B and the depth information 320. Thereafter, points inside the detected bounding box may be projected to a 3D space to obtain the point cloud. The point cloud may include a set of 3D points, usually defined by "X, Y, and Z" coordinates in a 3D coordinate system. In its 3D representation, the point cloud may spatially sample a surface portion of the subject's face 114 for a 3D representation of various facial features, such as eyes, nose, lips, ears, cheeks, or jaws.

The generation of the 3D model may further include acquisition of a 3D mean-shape model of a reference 3D face. As an example, the 3D mean-shape model may be a part of a Principle Component Analysis (PCA) model, which may be built from a set of reference face meshes, for example, about 100-300 faces of different subjects. The PCA model may further include a plurality of shape components associated with the 3D mean-shape model. The application of dimensionality reduction may help to identify and extract certain key uncorrelated data components from a large set of correlated data components.

In an embodiment, the circuitry 202 may acquire the 3D mean-shape model from a data source, such as the server 104. Once acquired, the electronic device 102 may be configured to store the 3D mean-shape model of the reference 3D face in a neutral expression and the plurality of shape components associated with the PCA model in the memory 204. Alternatively, in case the 3D mean-shape model is pre-stored in the memory 204, the circuitry 202 may acquire the 3D mean-shape model from the memory 204. The PCA model may be a morphable face model, which may be constructed by applying dimensionality reduction on a set of reference facial meshes. The morphable face model may act as a prior for reconstruction of the 3D model of the subject's face 114. For instance, such reconstruction may be based on alignment (such as rigid and/or non-rigid alignment) and a fitting process of the morphable face model with the generated point cloud of the subject's face 114.

The generation of the 3D model may further include a rigid alignment of the acquired 3D mean-shape model with the acquired point cloud. In an embodiment, the circuitry 202 may rigid-align the acquired 3D mean-shape model with the acquired point cloud to generate an aligned 3D mean-shape model. The generation of the 3D model may further include determination of a correspondence between the aligned 3D mean-shape model and the acquired point cloud. Specifically, the correspondence may be determined for the fitting process of the morphable face model. The fitting process may include an estimation of best coefficients of the shape components for the aligned 3D mean-shape model based on a minimization of a difference between the aligned 3D mean-shape model and the correspondence with the point cloud. For example, after fitting, the aligned 3D mean-shape model may be a mean face with some linear combination of the shape components). In an embodiment, based on the determined correspondence and the fitting process, the aligned 3D mean-shape model may be deformed to generate the 3D model, such as a 3D model 322. As the second color image 318B includes color information, 2D position information, and texture information of object(s) from the second viewpoint 116B, the generated 3D model 322 may include texture information associated with the subject's face 114 from the second viewpoint 116B (e.g., the frontal viewpoint).

At 306, viewpoint-specific projections may be generated. In an embodiment, the circuitry 202 may be configured to generate a set of viewpoint-specific projections of the generated 3D model (e.g., the 3D model 322) along the set of viewpoints. To generate each of such projections, the circuitry 202 may be configured to project the 3D model 322 onto a 2D image plane along each of the set of viewpoints. Such projections may be perspective or orthographic projections of the 3D model 322. For example, the 3D model 322 may be projected along the first viewpoint 116A, the second viewpoint 116B, and the third viewpoint 116C to generate a first projection 324A, a second projection 324B, and a third projection 324C, respectively.

Each of the viewpoint-specific projections associated with a certain viewpoint may be generated based on one or more alignment parameters associated with an imaging sensor that may configured to capture a color image from the corresponding viewpoint. For example, the first projection 324A may be generated based on the one or more alignment parameters associated with the first image sensor 108A that may capture the corresponding first viewpoint 116A. Examples of the one or more alignment parameters associated with the image sensor (e.g., the image sensors 108A, 108B, and 108C) may include, but are not limited to, a focal length, an aperture, an image sensor format, a principal point, a scale factor, and a lens distortion, associated with the image sensor.

At 308, the generated 3D model (e.g., the 3D model 322) may be refined. In an embodiment, the circuitry 202 be configured to refine the generated 3D model 322 based on minimization of a difference between each viewpoint-specific projection of the generated set of viewpoint-specific projections and a corresponding color image of the acquired set of color images.

In an embodiment, the refinement of the 3D model 322 may be a 3D flow-based refinement. At first, the circuitry 202 may be configured to determine an objective function for the refinement of the generated 3D model 322. The objective function may include a first term for the minimization of the difference between each of the set of viewpoint-specific projections (e.g., the viewpoint-specific projections 324A, 324B, and 324C) and the corresponding color image of the acquired set of color images (e.g., the color images 318A, 318B, and 318C). The objective function may further include a second term to minimize an offset between a set of landmark points on each of the set of viewpoint-specific projections (e.g., the viewpoint-specific projections 324A, 324B, and 324C) and a corresponding set of feature points on a corresponding color image of the acquired set of color images (e.g., the color images 318A, 318B, and 318C). The objective function may further include a third term for the minimization of a sum of gradient magnitude of each component of a 3D flow term for each vertex of the generated 3D model 322. In an embodiment, the circuitry 202 may refine the 3D model 322 based on a minimization of the determined objective function. Shown as an example, the 3D model 322 may be refined to generate a refined 3D model 326. The refinement of the 3D model 322 is described further, for example, in FIGS. 4A, 4B, 4C, and 4D.

At 310, a set of texture maps may be generated. In an embodiment, the circuitry 202 may be configured to generate the set of texture maps corresponding to the set of viewpoints. The generation of the set of texture maps may be done based on the refined 3D model 326 and the acquired set of color images (e.g., the color images 318A, 318B, and 318C). As an example, a first texture map 328A corresponding to the first viewpoint 116A may be generated based on the refined 3D model 326 and the first color image 318A. Similarly, a second texture map 328B corresponding to the second viewpoint 116B and a third texture map 328C corresponding to the third viewpoint 116C may be generated. The second texture map 328B may be generated based on the refined 3D model 326 and the second color image 318B, while the third texture map 328C may be generated based on the refined 3D model 326 and the third color image 318C.

In an embodiment, each color image may include color information, 2D position information, and texture information of object(s) captured from a respective viewpoint. In some embodiments, the refined 3D model 326 may be an un-textured 3D model including a plurality of triangular meshes. To generate a texture map, the circuitry 202 may generate a U-V co-ordinate map. The circuitry 202 may generate a texture map (e.g., the first texture map 328A) of the subject's face 114 based on a color image (e.g., the first color image 318A) corresponding to a viewpoint (e.g., the first viewpoint 116A) for which the texture map is to be generated, and the refined 3D model 326 (which may be an un-textured 3D model). The circuitry 202 may be configured to transform and map each triangle of a plurality of triangles on the color image (e.g., the first color image 318A) to a corresponding triangle on a U-V coordinate map by using the refined 3D model 326. The U-V coordinate map may depict texture information for a 3D model on a 2D layout. The first texture map 328A may be generated by a direct application of texture (or color information) from the first color image 318A.

At 312, an energy value may be estimated. In an embodiment, the circuitry 202 may be configured to estimate an energy value for each pixel of a final texture map. In an embodiment, the estimated energy value may be a weighted sum of a first energy associated with grayscale values of the set of texture maps, a second energy associated with gradient values of the set of texture maps, and a third energy associated with confidence values for the set of texture maps.

In an embodiment, the circuitry 202 may be configured to convert each of the generated set of texture maps into a corresponding set of grayscale texture maps. The first energy may be determined based on the corresponding set of grayscale texture maps. In an embodiment, the circuitry 202 may be configured to apply a gradient filter over each of the generated set of texture maps to generate a corresponding set of gradient texture maps. The second energy may be determined based on the corresponding set of gradient texture maps.

In order to determine the third energy, the circuitry 202 may be configured to determine per-vertex confidence values for corresponding vertices of the refined 3D model 326. Each of the per-vertex confidence values may be determined based on an angle between a first normal to a reference image plane and a second normal to a respective vertex of the refined 3D model 322. For each of the generated set of texture maps, the reference image plane may be set based on an image plane of a respective color image of the set of color images. For example, if there are three texture maps for three corresponding viewpoints, then there may be three reference image planes, aligned according to the corresponding viewpoints. Based on the determined per-vertex confidence values, the circuitry 202 may be configured to determine the confidence values for pixels of the generated set of texture maps. The third energy may be determined based on the determined confidence values. The determination of the per-vertex confidence values is described further, for example, in FIG. 6. The estimation of the energy values is described further, for example, in FIG. 7.

Each of the three texture maps may include correct texture of regions of the subject's face which are not occluded in the respective color image of the subject's face. Whereas each of such texture maps may have inaccurate texture of other regions which are partially or fully occluded in the respective color images. As an example, the first color image 318A may capture the right-side of the subject's face 114. In the first color image 318A, the left-side of the subject's face 114 including, for example, the left-ear may be occluded. Thus, a region representing the left-side of the subject's face 114 in the first texture map 328A may be wrongly projected due to occlusion of the left-ear in the first color image 318A. To overcome this limitation, the circuitry 202 may stitch respective portions of the three texture maps together along seams such that the final texture map, that may be generated after the stitching, may be free from inaccurate texture of regions occluded in the respective color images.

At 314, a set of seams may be determined. In an embodiment, the circuitry 202 may be configured to execute a dynamic programming workflow to determine a set of seams along which respective portions of the generated set of texture maps (i.e., the texture maps 328A, 328B, and 328C) may have to be stitched to obtain the final texture map.

In an embodiment, the circuitry 202 may be configured to divide a layout for the final texture map into regions. Thereafter, the circuitry 202 may be configured to determine a range of selection for each of the seams in the divided layout. The range of selection may be determined based on a user input. The dynamic programming workflow may be executed to determine the seams in the divided layout by searching for, within the determined range of selection, each pixel of the final texture map for which the determined energy value may be a minimum. The determination of the seams is described further, for example, in FIGS. 8 and 9.

At 316, respective portions of the generated texture maps may be stitched along the determined seams. In an embodiment, the circuitry 202 may stitch respective portions of the generated texture maps (i.e., the texture maps 328A, 328B, and 328C) along the determined seams to generate the final texture map for the refined 3D model 326 of the subject's face 114. For example, the circuitry 202 may generate a final texture map 330 by stitching the respective portions of the texture maps 328A, 328B, and 328C along a first seam 332A, a second seam 332B, a third seam 332C, a fourth seam 332D, a fifth seam 332E, and a sixth seam 332F. In an embodiment, the respective portions of the generated set of texture maps (i.e., the texture maps 328A, 328B, and 328C) may be stitched based on an alpha blending of the respective portions along the determined set of seams. An example of the alpha blending is described further, for example, in FIG. 11. An example of the final texture map is provided, for example, in FIG. 10.

Figure 4A:
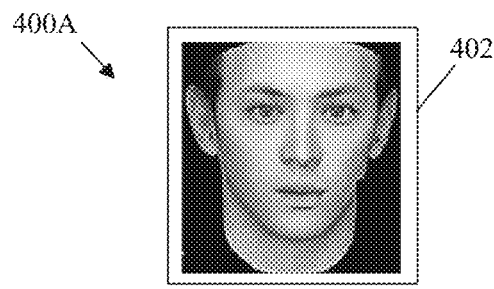
FIG. 4A is a diagram that illustrates an exemplary three-dimensional (3D) model of a face of a subject, in accordance with an embodiment of the disclosure.

FIG. 4A is a diagram that illustrates an exemplary three-dimensional (3D) model of a face of a subject, in accordance with an embodiment of the disclosure. FIG. 4A is described in conjunction with elements from FIGS. 1, 2, and 3. With reference to FIG. 4A, there is shown a diagram 400A. The diagram 400A may include a 3D model 402 of the subject's face 114. In an embodiment, the circuitry 202 may generate the 3D model 402 based on at least one first color image of the subject's face 114 and depth information of the subject's face 114. As an example, the first color image may be selected as the second color image 318B and the depth information may be selected as the depth information 320. The generation of the 3D model 402 is described further, for example, in FIG. 3.

Figure 4B:
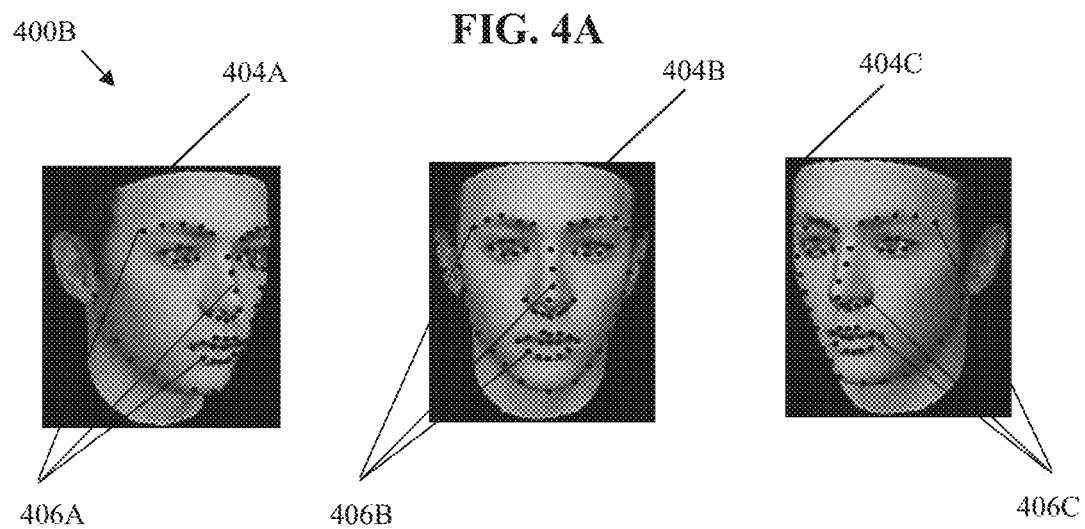
FIG. 4B is a diagram that illustrates a set of viewpoint-specific projections of a 3D model of a face of a subject along a set of viewpoints, in accordance with an embodiment of the disclosure.

FIG. 4B is a diagram that illustrates a set of viewpoint-specific projections of a 3D model of a face of a subject along a set of viewpoints, in accordance with an embodiment of the disclosure. FIG. 4B is described in conjunction with elements from FIGS. 1, 2, 3, and 4A. With reference to FIG. 4B, there is shown a diagram 400B. The diagram 400B may include a set of viewpoint-specific projections of the 3D model 402 of the subject's face 114. The set of viewpoint-specific projections of the 3D model 402 may include a first projection 404A along the first viewpoint 116A, a second projection 404B along the second viewpoint 116B, and a third projection 404C along the third viewpoint 116C. In an embodiment, the circuitry 202 may generate the set of viewpoint-specific projections (i.e., the projections 404A, 404B, and 404C) of the 3D model 402 along the set of viewpoints (i.e., the viewpoints 116A, 116B, and 116C, respectively). The generation of the set of viewpoint-specific projections is described further, for example, in FIG. 3.

Each of the generated viewpoint-specific projections may include a set of landmark points associated with the 3D model 402. The set of landmark points in each of the generated viewpoint-specific projections may be points that may define key face features of the 3D model 402. Examples of such face features may include, but are not limited to, a face contour, lips, mouth, nose, eyes, eyebrows, cheeks, and ears. In an example, the first projection 404A may include a set of landmark points 406A, the second projection 404B may include a set of landmark points 406B, and the third projection 404C may include a set of landmark points 406C.

In an embodiment, the circuitry 202 may acquire a plurality of pre-defined landmark points on the 3D model 402. There may be one complication at the contour of the subject's face 114 as the contour points around the subject's face 114 in a color image may not correspond to a fixed set of points on the 3D model 402. Further, such correspondence may depend on a viewpoint associated with an image sensor of the sensing device 106 that captures the color image. In order to solve this issue, a landmark marching method may be used to select indices of landmarks on the contour of the 3D model 402 from among the acquired plurality of pre-defined landmark points.

The circuitry 202 may apply the landmark marching method on a subset of landmark points around a contour of the 3D model 402 to select a set of landmark points from among the acquired plurality of pre-defined landmark points. Herein, the subset of landmark points may be a part of the acquired plurality of pre-defined landmark points. Further, each of the generated viewpoint-specific projections (i.e., the projections 404A, 404B, and 404C) may include the selected set of landmark points. For example, as shown in FIG. 4B, the projection 404A may include the set of landmark points 406A, which may be selected from among the acquired plurality of pre-defined landmark points on the 3D model 402. The selection of the set of landmark points 406A based on the landmark marching method is described further, for example, in FIGS. 5A and 5B.

Figure 4C:
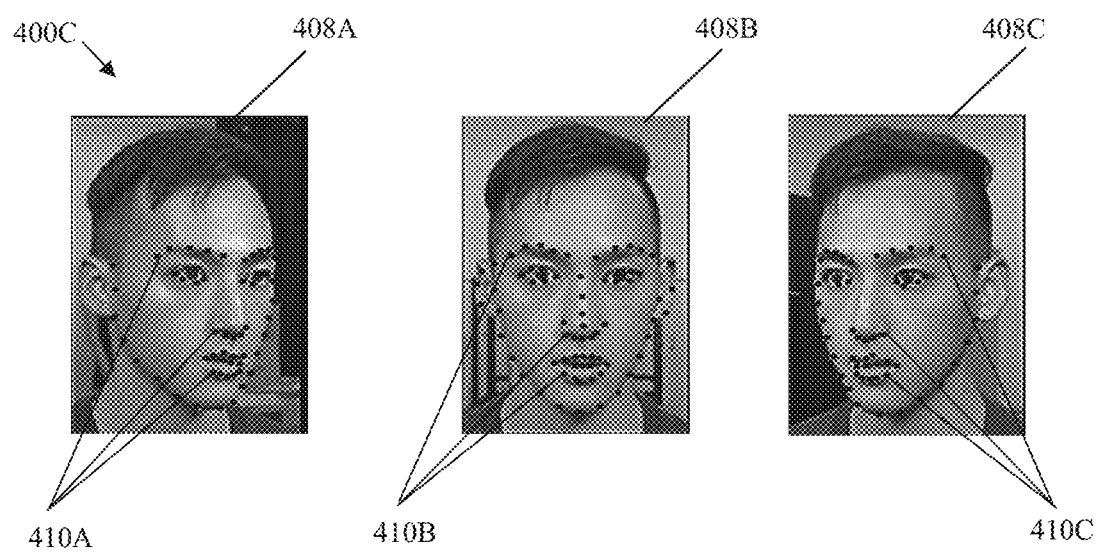
FIG. 4C is a diagram that illustrates a set of color images of a face of a subject from a set of viewpoints, in accordance with an embodiment of the disclosure.

FIG. 4C is a diagram that illustrates a set of color images of a face of a subject from a set of viewpoints, in accordance with an embodiment of the disclosure. FIG. 4C is described in conjunction with elements from FIGS. 1, 2, 3, 4A, and 4B. With reference to FIG. 4C, there is shown a diagram 400C. The diagram 400C may include a set of color images of the subject's face 114 from a set of viewpoints. The set of color images of the subject's face 114 may include a first color image 408A from the first viewpoint 116A, a second color image 408B from the second viewpoint 116B, and a third color image 408C from the third viewpoint 116C. In an embodiment, the first image sensor 108A may capture the first color image 408A, the second image sensor 108B may capture the second color image 408B, and the third image sensor 108C may capture the third color image 408C. The circuitry 202 may acquire each of the set of color images (i.e., the color images 408A, 408B, and 408C) from the sensing device 106.

The circuitry 202 may use a face modeler on each of the set of color images (i.e., the color images 408A, 408B, and 408C) to detect a set of feature points associated with key face features, such as, but not limited to, a face contour, lips, mouth, nose, eyes, eyebrows, cheeks, and ears. In an example, the first color image 408A may include a set of feature points 410A, the second color image 408B may include a set of feature points 410B, and the third color image 408C may include a set of feature points 410C. The set of feature points on each of the set of color images may correspond to a corresponding set of landmark points on a corresponding viewpoint-specific projection as the set of feature points and the set of landmark points may be associated with the same key face features of the subject's face 114. For example, the set of feature points 410A on the first color image 408A may correspond to the set of landmark points 406A on the first projection 404A. As an example, a feature point of the set of feature points 410A (in the first color image 408A) associated with the nose of the subject's face 114 may correspond to a landmark point of the set of landmark points 406A (in the first projection 404A) associated with the nose of the subject's face 114.

It should be noted that the diagram 400A, the diagram 400B, and the diagram 400C are for exemplary purpose and should not be construed as limiting for the present disclosure.

Figure 4D:
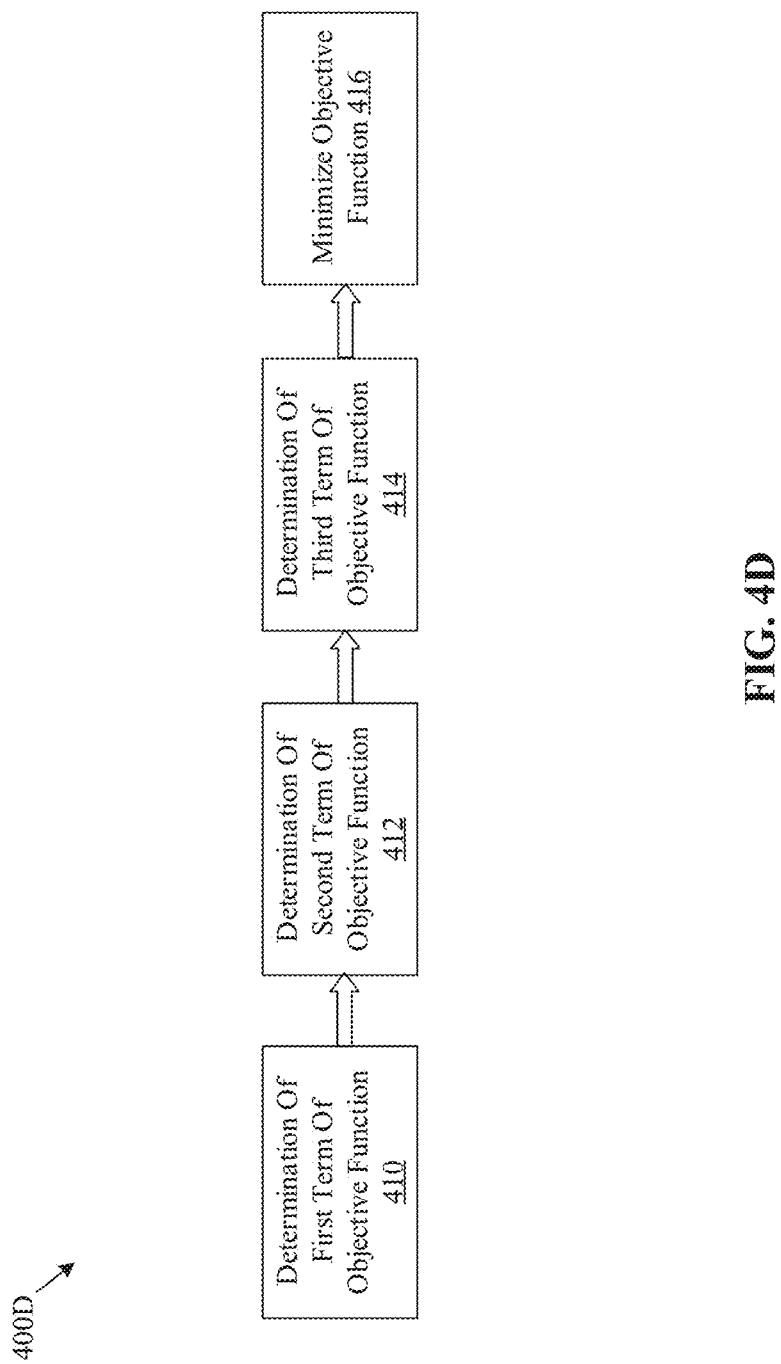
FIG. 4D is a diagram that illustrates an exemplary processing pipeline for refinement of a 3D model of a face of a subject, in accordance with an embodiment of the disclosure.

FIG. 4D is a diagram that illustrates an exemplary processing pipeline for refinement of a 3D model of a face of a subject, in accordance with an embodiment of the disclosure. FIG. 4D is explained in conjunction with elements from FIG. 1, FIG. 2, FIG. 3, FIG. 4A, FIG. 4B, and FIG. 4C. With reference to FIG. 4D, there is shown a processing pipeline of operations from 412 to 418 to depict refinement of a 3D model (e.g., the 3D model 402) of the subject's face 114. The circuitry 202 may execute the operations from 412 to 418.

In an embodiment, the circuitry 202 may be configured to refine the generated 3D model 402. The refinement may be based on minimization of a difference between each viewpoint-specific projection of the generated set of viewpoint-specific projections (e.g., the projections 404A, 404B, and 404C) and a corresponding color image of the acquired set of color images (e.g., the color images 408A, 408B, and 408C, respectively). In an embodiment, the circuitry 202 may be configured to determine an objective function for the refinement of the generated 3D model 402. The objective function may include a first term, a second term, and a third term. The generated 3D model 402 may be refined based on a minimization of the determined objective function.

At 412, the first term of the objective function may be determined. In an embodiment, the circuitry 202 may be configured to determine the first term of the objective function. The first term may be for the minimization of the difference between each viewpoint-specific projection of the generated set of viewpoint-specific projections (e.g., the projections 404A, 404B, and 404C) and the corresponding color image of the acquired set of color images (e.g., the color images 408A, 408B, and 408C, respectively). The first term of the objective function may be represented as follows in equation (1):

$$T_1(f) = \sum_j \sum_v |l_j(P_j(v+f(v))) - C(v)|^2 \quad (1)$$

where,
$T_1(f)$ may represent the first term of the objective function;
v may represent a vertex from the pre-estimated face model (e.g., the 3D model 402);
j may represent an index of an RGB (color) image;
f(v) may represent a 3D flow for the vertex v;
P(v+f(v)) may represent a projected 2D position on the image;
l(P(v+f(v))) may represent a value of an RGB (color) image at the back-projected position; and
C(v) may represent a texture value of the vertex v from the pre-estimated face model (e.g., the 3D model 402);

Herein, the 3D flow for each vertex may represent an offset of the vertex between an initial 3D mesh of a pre-estimated 3D model (e.g., the 3D model 402) and a target 3D mesh of a refined 3D model. The 3D flow may be estimated by an iterative optimization of a difference between the initial (or pre-estimated) 3D mesh and the target (or refined) 3D mesh. The iterative optimization (i.e., an iterative minimization of the objective function) may be achieved based on a comparison of each view-specific projection of the generated set of view-specific projections (e.g., the projections 404A, 404B, and 404C) with a corresponding color image from the set of color images (e.g., the color images 408A, 408B, and 408C, respectively) in each iteration.

At 414, the second term of the objective function may be determined. In an embodiment, the circuitry 202 may be configured to determine the second term of the objective function. The second term may be to minimize an offset between a set of landmark points on each viewpoint-specific projection of the generated set of viewpoint-specific projections (e.g., the projections 404A, 404B, and 404C) and a corresponding set of feature points on a corresponding color image of the acquired set of color images (e.g., the color images 408A, 408B, and 408C, respectively). In an example, the second term may be used to minimize an offset between the set of landmark points 406A on the first projection 404A and the corresponding set of feature points 410A on the first color image 408A. Further, the second term may be used to minimize an offset between the set of landmark points 406B and the corresponding set of feature points 410B. Similarly, the second term may be used to minimize an offset between the set of landmark points 406C and the corresponding set of feature points 410C. The second term of the objective function may be represented as follows in equation (2):

$$T_2(f) = \sum_j \sum_l |(P_j(l+f(l))) - w_j(l)|^2 \quad (2)$$

where,
$T_2(f)$ may represent the second term of the objective function;
l may represent a vertex that may belong to the set of landmarks on the 3D model 402;
j may represent an index of an RGB (color) image;
$w_j(l)$ may represent detected landmarks from color image j;
f(l) may represent a 3D flow for the vertex l; and
P(l+(l)) may represent a projected 2D position on the image.

At 416, the third term of the objective function may be determined. In an embodiment, the circuitry 202 may be configured to determine the third term of the objective function. The third term may be for the minimization of a sum of a gradient magnitude of each component of a 3D flow term for each vertex of the generated 3D model 402. The third term of the objective function may be represented as follows in equation (3):

$$T_3(f) = (|\nabla f_x|^2 + |\nabla f_y|^2 + |\nabla f_z|^2) \quad (3)$$

where,
$T_3(f)$ may represent the third term of the objective function; and
$|\nabla f_x|^2$, $|\nabla f_y|^2$, $|\nabla f_z|^2$ may represent gradient magnitudes of components of the 3D flow.

Each of $\nabla f_x$, $\nabla f_y$, and $\nabla f_z$ may represent a difference on x, y, and z dimensions between offsets f and may be estimated for two vertices that may share the same edge on a 3D mesh of the pre-estimated face model (e.g., the 3D model 402). The objective function may not include a term associated with depth information of the subject's face 114 as the depth information of the subject's face 114 may be available only for one of the viewpoints associated with a certain color image and not all of the color images of the set of color images.

At 418, the objective function may be minimized. In an embodiment, the circuitry 202 may be configured to minimize the objective function. The circuitry 202 may determine the objective function to be minimized based on the determined first term (at 412), the determined second term (at 414), and the determined third term (at 416) of the objective function. The objective function may be represented as follows in equation (4):

$$E_{flow3D}(f)=T_1(f)+\beta T_2(f)+\alpha T_3(f) \quad (4)$$

where, $E_{flow3D}(f)$ may represent the objective function for 3D flow refinement of the 3D model 402; and $\alpha$ and $\beta$ may represent weights to be optimized for the minimization of the objective function.

In an embodiment, the circuitry 202 may execute a refinement of the 3D model 402 by determination of the 3D flow for each vertex on the 3D mesh of the 3D model 402 based on the minimization of the objective function. For the minimization of the objective function, the circuitry 202 may estimate a value of the term of RGB (color) and landmark positions for a Jacobian matrix over the x dimension based on equations (5), (6), and (7), which may be given as follows:

$$f(v) = [x, y, z]^T \quad (5)$$

$$\frac{\partial}{\partial x} l_j(P_j(v + f(v))) = l_{j,u}\frac{\partial u}{\partial x} + l_{j,v}\frac{\partial v}{\partial x} \quad (6)$$

$$\frac{\partial}{\partial x} P_j(l + f(l)) = \left[\frac{\partial v}{\partial x}, \frac{\partial u}{\partial x}\right] \quad (7)$$

where, u and v may represent the horizontal and vertical co-ordinates in a 2D color image; and $l_{j,v}$ and $l_{j,u}$ may represent image derivatives of the $j^{th}$ color image over the horizontal and vertical dimensions of the color image co-ordinate system.

The Jacobian values over the y and z dimensions may be estimated in a manner similar to estimation of the Jacobian value over the x dimension, by use of equations (5), (6), and (7). For example, the Jacobian values over the y and z dimensions may be estimated based on partial differentiations of terms in the equations (6) and (7) over y and z respectively, instead of the partial differentiation over x. The image derivatives $l_{j,v}$ and $l_{j,u}$ over the horizontal and vertical axes may be estimated based on the 5-point derivate filter $$\frac{1}{12}[1, -8, 0, 8, 1].$$

Figures 5A, 5B:
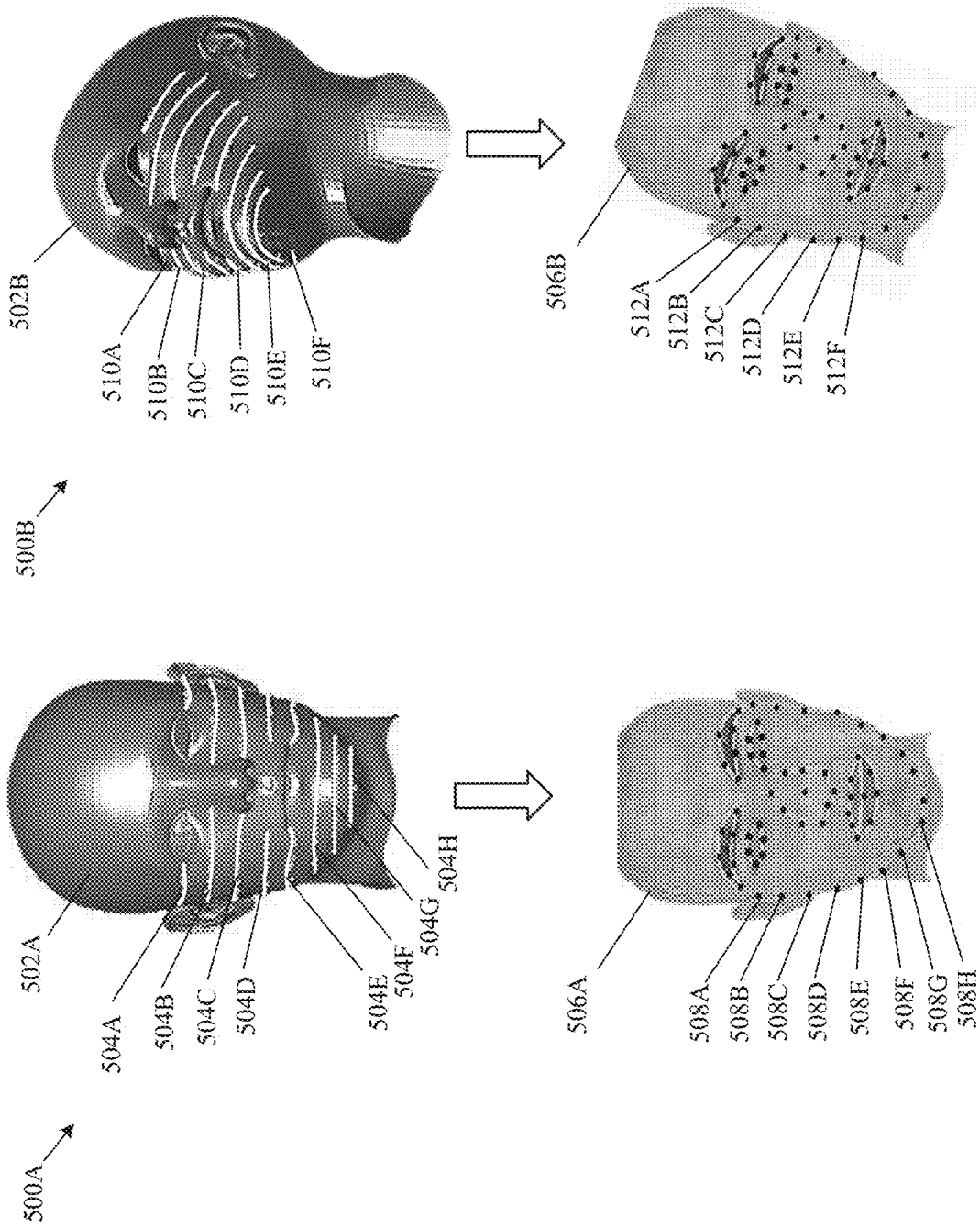
FIG. 5A is a diagram that illustrates an exemplary scenario for selection of a set of landmark points based on a landmark marching method, in accordance with an embodiment of the disclosure.
FIG. 5B is a diagram that illustrates another exemplary scenario for selection of a set of landmark points based on a landmark marching method, in accordance with an embodiment of the disclosure.

FIG. 5A is a diagram that illustrates an exemplary scenario for selection of a set of landmark points based on a landmark marching method, in accordance with an embodiment of the disclosure. FIG. 5A is described in conjunction with elements from FIGS. 1, 2, 3, 4A, 4B, 4C, and 4D. With reference to FIG. 5A, there is shown an exemplary first scenario 500A. In the first scenario 500A, there is shown a first 3D model 502A. The first scenario 500A further includes a first projection 506A as a viewpoint-specific projection associated with the frontal viewpoint of the subject's face 114. The circuitry 202 may generate the first projection 506A along the frontal viewpoint of the subject's face 114, based on the first 3D model 502A.

In an embodiment, the circuitry 202 may acquire a plurality of pre-defined landmark points on the first 3D model 502A. The circuitry 202 may select a subset of landmark points around a contour of the first 3D model 502A. The subset of landmark points may be considered to be included in the acquired plurality of pre-defined landmark points. Further, the circuitry 202 may apply a landmark marching method on the subset of landmark points to select a set of landmark points from among the acquired plurality of pre-defined landmark points.

By way of example, and not limitation, to apply the landmark marching method, the circuitry 202 may acquire indices of points that may lie on parallel lines between the subset of landmark points. As the first 3D model 502A may be associated with a frontal view of the subject's face 114, a left-most vertex and a right-most vertex of each of the parallel lines may be same as a left most landmark point and a right most landmark point on the contour of the face in the first 3D model 502A. In a frontal view of the face, there may be minimal or no occlusion at both the left side and the right side of the face. Thus, in the current case, there may be a one-to-one correspondence between the subset of landmark points on the first 3D model 502A and landmark points to be selected from among the acquired plurality of pre-defined landmark points as the set of landmark points for the first projection 506A. As an example, vertices 504A, 504B, 504C, 504D, 504E, 504F, 504G, and 504H may be the left-most vertices on the parallel lines and may also be landmark points on the left portion contour of the face in the first 3D model 502A. Thus, the vertices 504A, 504B, 504C, 504D, 504E, 504F, 504G, and 504H may lie on the contour of the face and be landmark points themselves. The circuitry 202 may determine landmark points 508A, 508B, 508C, 508D, 508E, 508F, 508G, and 508H in the first projection 506A as landmark points on the contour of the face, which may correspond to the vertices 504A, 504B, 504C, 504D, 504E, 504F, 504G, and 504H, based on the landmark marching method.

FIG. 5B is a diagram that illustrates another exemplary scenario for selection of a set of landmark points based on a landmark marching method, in accordance with an embodiment of the disclosure. FIG. 5B is described in conjunction with elements from FIGS. 1, 2, 3, 4A, 4B, 4C, 4D, and 5A. With reference to FIG. 5B, there is shown an exemplary second scenario 500B. The second scenario 500B includes a second 3D model 502B associated with a non-frontal viewpoint of the subject's face 114. As an example, the non-frontal view of the subject's face 114 may be a viewpoint in which the subject's face 114 may be titled towards the left-side. The second scenario 500B further includes a second projection 506B. The circuitry 202 may generate the second projection 506B from the second 3D model 502B along the non-frontal viewpoint of the subject's face 114.

In an embodiment, the circuitry 202 may acquire a plurality of pre-defined landmark points on the second 3D model 502B. The circuitry 202 may select a subset of landmark points around a contour of the second 3D model 502B. The subset of landmark points may be considered to be included in the acquired plurality of pre-defined landmark points. Further, the circuitry 202 may apply a landmark marching method on the subset of landmark points to select a set of landmark points from among the acquired plurality of pre-defined landmark points. To apply the landmark marching method, the circuitry 202 may acquire indices of points that may lie on parallel lines between the subset of landmark points. As the second 3D model 502B may be associated with the non-frontal view of the subject's face 114 in which the subject's face 114 may be titled towards the left-side, a portion of the left-side of the face may be occluded. Hence, there may not be a one-to-one correspondence between the subset of landmark points on the second 3D model 502B and landmark points which may have to be selected from among the acquired plurality of pre-defined landmark points as the set of landmark points for the second projection 506B. Based on an application of the landmark marching method on the subset of landmark points, the circuitry 202 may select the left-most vertices on each parallel line as landmark points for the left portion of the contour of the face on the second projection 506B. This may be because the left-most vertices on the parallel lines may represent occluded landmark points associated with the left portion of contour of the face on the second projection 506B. As an example, vertices 510A, 510B, 510C, 510D, 510E, and 510F may be the left-most vertices on the parallel lines in the second 3D model 502B. The circuitry 202 may determine landmark points 512A, 512B, 512C, 512D, 512E, and 512F in the second projection 506B as landmark points on the contour of the face, which may correspond to the vertices 510A, 510B, 510C, 510D, 510E, and 510F based on the landmark marching method.

It should be noted that the first scenario 500A and the second scenario 500B are merely provided as two separate examples and should not be construed as limiting for the present disclosure.

Figure 6:
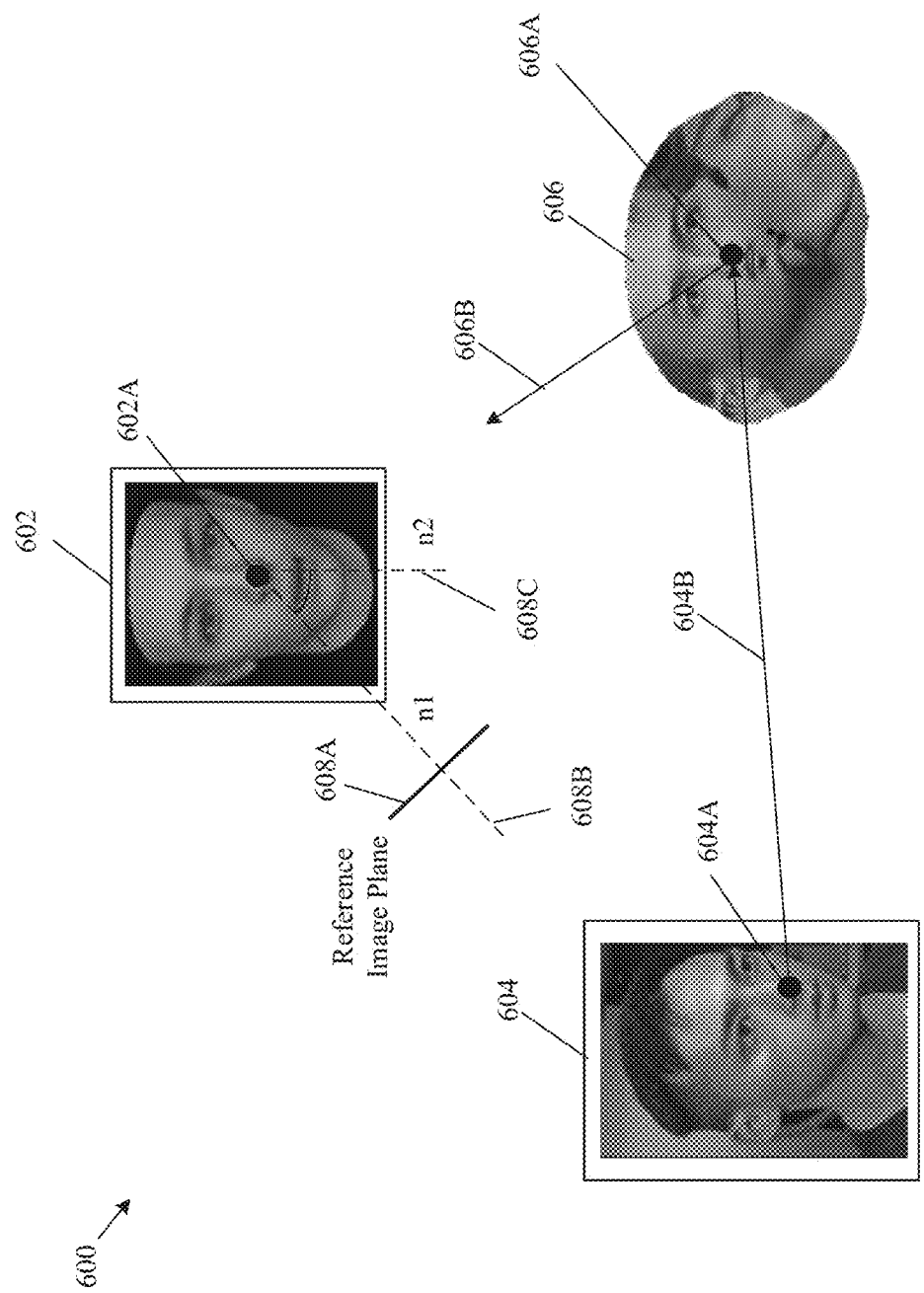
FIG. 6 is a diagram that illustrates an exemplary scenario for determination of confidence values of pixels of a texture map, in accordance with an embodiment of the disclosure.

FIG. 6 is a diagram that illustrates an exemplary scenario for determination of confidence values of pixels of a texture map, in accordance with an embodiment of the disclosure. FIG. 6 is described in conjunction with elements from FIGS. 1, 2, 3, 4A, 4B, 4C, 4D, 5A, and 5B. With reference to FIG. 6, there is shown an exemplary scenario 600. In the scenario 600, there is shown a refined 3D model 602, a first color image 604, and a first texture map 606 generated based on the first color image 604. In the scenario 600, there is further shown a first vertex 602A of the refined 3D model 602, a first pixel 604A of the first color image 604, and a first pixel 606A of the first texture map 606. The first vertex 602A may correspond to the first pixel 604A of the first color image 604 and the first pixel 606A of the first texture map 606.

In FIG. 6, there is further shown a first normal 604B (represented by $n_1$) to a reference image plane 608A of the first color image 604. The first normal 604B intersects the reference image plane 608A at the position of the first pixel 604A in the first color image 604. There is further shown a second normal 606B (represented by $n_2$) to the first vertex 602A of the refined 3D model 602.

The circuitry 202 may be configured to determine per-vertex confidence values for corresponding vertices of the refined 3D model 602. Each of the per-vertex confidence values may be determined based on an angle between a first normal to a reference image plane and a second normal to a respective vertex of the refined 3D model 602. For example, the circuitry 202 may determine a confidence value for the first vertex 602A based on an angle between the first normal 608B ($n_1$) to the reference image plane 608A and the second normal 608C ($n_2$) to the first vertex 602A of the refined 3D model 602. For example, the confidence value for the first vertex 602A may be determined by equation (8), as follows:

$$w = \max(0, \cos(n_1^T n_2)) \qquad (8)$$

where,
w: confidence value for the first vertex 602A,
max(.): maximum function, and
$(.)^T$: matrix transpose operation.

After the per-vertex confidence values are determined, the circuitry 202 may determine the confidence values for pixels of the generated set of texture maps (such as the texture map 606) based on the determined per-vertex confidence values. By way of example, and not limitation, for a first pixel 606A of the texture map 606 (which is one of the generated set of texture maps), the confidence values may include a first confidence value. The first confidence value may be determined based on a Barycentric interpolation of a set of per-vertex confidence values of the determined per-vertex confidence values. Such set of per-vertex confidence values may correspond to vertices which may be neighboring the first vertex 602A associated with the first pixel 606A.

Figure 7A:
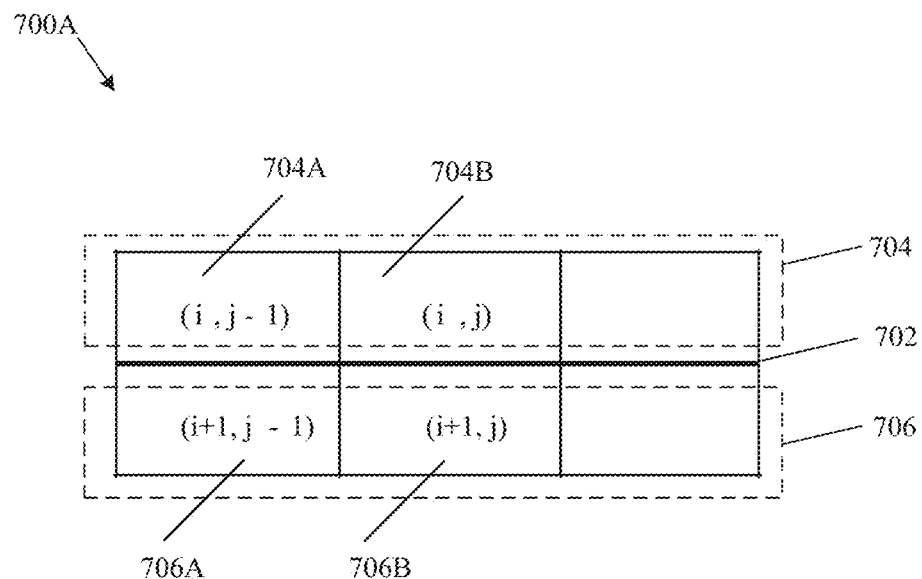
FIG. 7A is a diagram that illustrates a horizontal seam between two texture maps, in accordance with an embodiment of the disclosure.

FIG. 7A is a diagram that illustrates a horizontal seam between two texture maps, in accordance with an embodiment of the disclosure. FIG. 7A is described in conjunction with elements from FIGS. 1, 2, 3, 4A, 4B, 4C, 4D, 5A, 5B, and 6. With reference to FIG. 7A, there is shown a diagram 700A. In the diagram 700A, there is shown a horizontal seam 702 between a first portion 704 of a first texture map and a second portion 706 of a second texture map. There is further shown a first pixel 704A with an index (i, j−1) and a second pixel 704B with an index (i, j) in the first portion 704 of the first texture map. There is further shown a first pixel 706A with an index (i+1, j−1) and a second pixel 706B with an index (i+1, j) in the second portion 706 of the second texture map. The first portion 704 and the second portion 706 may be stitched along the horizontal seam 702 (i.e. along indices where corresponding horizontal energy values in the final texture map may be evaluated as minimum). For example, the first portion 704 and the second portion 706 may be stitched along the horizontal seam 702 between the first pixel 704A and the first pixel 706A and between the second pixel 704B and the second pixel 706B.

Figure 7B:
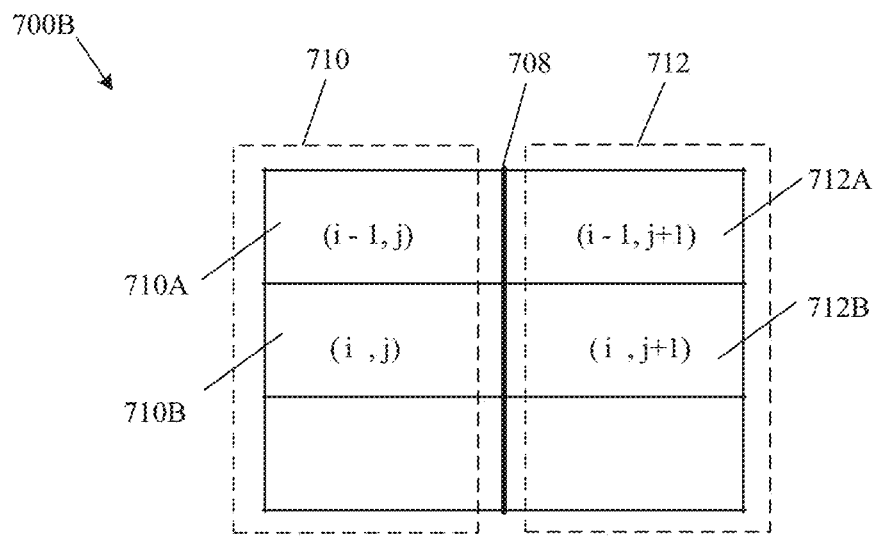
FIG. 7B is a diagram that illustrates a vertical seam between two texture maps, in accordance with an embodiment of the disclosure.

FIG. 7B is a diagram that illustrates a vertical seam between two texture maps, in accordance with an embodiment of the disclosure. FIG. 7B is described in conjunction with elements from FIGS. 1, 2, 3, 4A, 4B, 4C, 4D, 5A, 5B, 6, and 7A. With reference to FIG. 7B, there is shown a diagram 700B. The diagram 700B includes a vertical seam 708 between a first portion 710 of a first texture map and a second portion 712 of a second texture map. In FIG. 7B, there is shown a first pixel 710A with an index (i−1, j) and a second pixel 710B with an index (i, j) in the first portion 710 of the first texture map. There is further shown a first pixel 712A with an index (i−1, j+1) and a second pixel 712B with an index (i, j+1) in the second portion 712 of the second texture map. The first portion 710 and the second portion 712 may be stitched along the vertical seam 708 (i.e. along indices where corresponding vertical energy values in the final texture map may be evaluated as minimum). For example, the first portion 710 and the second portion 712 may be stitched along the vertical seam 708 between the first pixel 710A and the first pixel 712A and between the second pixel 710B and the second pixel 712B.

Figure 7C:
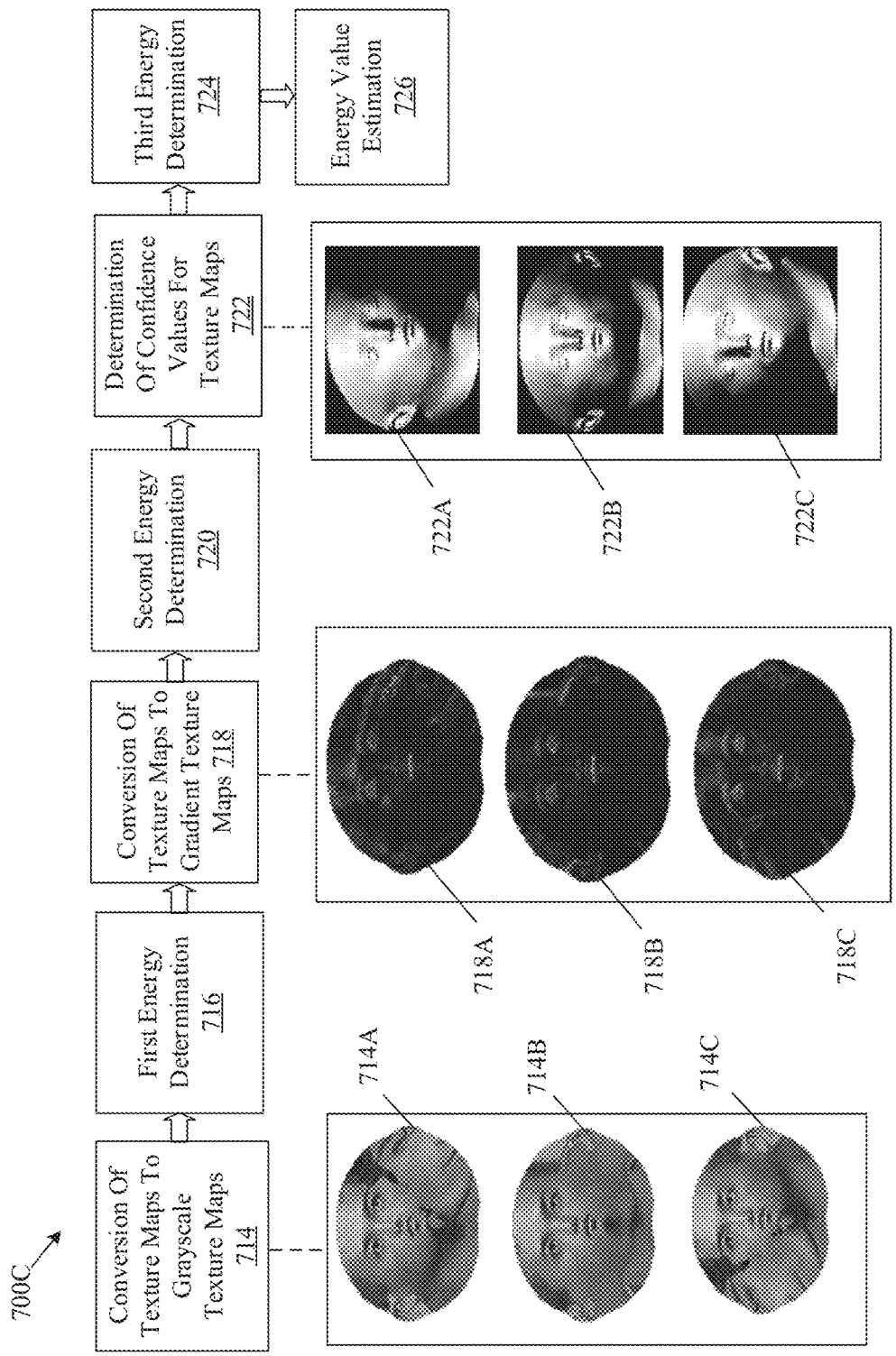
FIG. 7C is a diagram that illustrates an exemplary processing pipeline for estimation of an energy value for each pixel of a final texture map, in accordance with an embodiment of the disclosure.

FIG. 7C is a diagram that illustrates an exemplary processing pipeline for estimation of an energy value for each pixel of a final texture map, in accordance with an embodiment of the disclosure. FIG. 7C is explained in conjunction with elements from FIG. 1, FIG. 2, FIG. 3, FIG. 4A, FIG. 4B, FIG. 4C, FIG. 4D, FIG. 5A, FIG. 5B, FIG. 6, FIG. 7A, and FIG. 7B. With reference to FIG. 7C, there is shown a processing pipeline of operations from 714 to 726 to depict estimation of an energy value for each pixel of a final texture map of the subject's face 114.

At 714, the set of texture maps (e.g., the texture maps 328A, 328B, and 328C) may be converted to a set of grayscale texture maps. In an embodiment, the circuitry 202 may be configured to convert each of the generated set of texture maps into a corresponding set of grayscale texture maps based on transformation of RGB color values of pixels in each of the set of texture maps to corresponding grayscale values. Shown as an example, the set of grayscale texture maps may include a first grayscale texture map 714A corresponding to the first texture map 328A, a second grayscale texture map 714B corresponding to the second texture map 328B, and a third grayscale texture map 714C corresponding to the third texture map 328C.

At 716, a first energy associated with grayscale values of the set of texture maps may be determined. In an embodiment, the circuitry 202 may be configured to determine the first energy associated with the grayscale values of the set of texture maps (e.g., the texture maps 328A, 328B, and 328C) based on the corresponding set of grayscale texture maps (e.g., the grayscale texture maps 714A, 714B, and 714C). For each pixel (i, j) of the final texture map, a respective seam of the determined seams may include a horizontal seam and a vertical seam. Herein, for each pixel (i,j), the circuitry 202 may estimate an energy value (represented as $E^h(i\ j)$) for a possible horizontal seam and an energy value (represented as $E^v(i, j)$) for a possible vertical seam separately. For example, the first energy value associated with the grayscale values of a first texture map and a second texture map of the set of texture maps for a horizontal seam and a vertical seam may be determined by using equations (9) and (10), as follows:

$$E_c^h(i,j)=(C_1(i,j)-C_2(i+1,j))^2 \quad (9)$$

$$E_c^v(i,j)=(C_1(i,j)-C_2(i,j+1))^2 \quad (10)$$

where, $C_1$ may represent a first grayscale texture map (e.g., the first grayscale texture map 714A) corresponding to a first texture map (e.g., the first texture map 328A), $C_2$ may represent a second grayscale texture map (e.g., the second grayscale texture map 714B) corresponding to a second texture map (e.g., the second texture map 328B), $C_1(i, j)$ may represent a grayscale value associated with the $(i, j)^{th}$ pixel of the first grayscale texture map 714A, $C_2(i+1, j)$ may represent a grayscale value associated with the $(i+1, j)^{th}$ pixel of the second grayscale texture map 714B, $C_2(i, j+1)$ may represent a grayscale value associated with the $(i, j+1)^{th}$ pixel of the second grayscale texture map 714B, and $E_c^h(i,j)$, $E_c^v(i,j)$ may represent the first energy values associated with the first texture map 328A and the second texture map 328B for a horizontal seam and a vertical seam, respectively.

An example of a position of the $(i+1, j)^{th}$ pixel with respect to the $(i, j)^{th}$ pixel is provided in FIG. 7A. Further, an example of a position of the $(i, j+1)^{th}$ pixel with respect to the $(i, j)^{th}$ pixel is provided in FIG. 7B. The circuitry 202 may assign a small energy in case grayscale values across the seam are close to each other. This may ensure that the seam does not cross a region with a large texture difference. By way of example, and not limitation, for the horizontal seam, a first energy value for the $(i, j-1)^{th}$ pixel of the first portion in the first texture map may be greater than a first energy value for the $(i, j)^{th}$ pixel of the first portion (i.e., $E_c^h(i, j-1) > E_c^h(i, j)$). By way of example, and not limitation, for the vertical seam, a first energy value for the $(i-1, j)^{th}$ pixel of the first portion in the first texture map may be lesser than a first energy value for the $(i, j)^{th}$ pixel of the first portion (i.e., $E_c^v(i-1, j) < E_c^v(i, j)$). Examples of positions of the $(i, j-1)^{th}$ pixel and the $(i-1, j)^{th}$ pixel with respect to the $(i, j)^{th}$ pixel are provided in FIGS. 7A and 7B, respectively.

At 718, the set of texture maps (e.g., the texture maps 328A, 328B, and 328C) may be converted to a set of gradient texture maps. In an embodiment, the circuitry 202 may be configured to convert each of the generated set of texture maps to a corresponding set of gradient texture maps. The circuitry 202 may apply a gradient filter over each of the generated set of texture maps to generate the corresponding set of gradient texture maps. For example, the set of gradient texture maps may include a first gradient texture map 718A corresponding to the first texture map 328A, a second gradient texture map 718B corresponding to the second texture map 328B, and a third gradient texture map 718C corresponding to the third texture map 328C.

At 720, a second energy associated with gradient values of the set of texture maps may be determined. In an embodiment, the circuitry 202 may be configured to determine the second energy associated with the gradient values of the set of texture maps (e.g., the texture maps 328A, 328B, and 328C) based on the corresponding set of gradient texture maps (e.g., the gradient texture maps 718A, 718B, and 718C). As described in aforementioned, for each pixel (i, j) in the final texture map, the circuitry 202 may estimate an energy value (represented as $E^h(i, j)$) for a possible horizontal seam and an energy value (represented as $E^v(i, j)$) for a possible vertical seam separately. For example, the second energy value associated with the gradient values of a first texture map and a second texture map of the set of texture maps for a horizontal seam and a vertical seam may be determined by use of equations (11) and (12), as follows:

$$E_g^h(i,j)=G_1(i,j)^2+G_2(i+1,j)^2 \quad (11)$$

$$E_g^v(i,j)=G_1(i,j)^2+G_2(i,j+1)^2 \quad (12)$$

where, $G_1$ may represent a first gradient texture map (e.g., the first gradient texture map 718A) corresponding to a first texture map (e.g., the first texture map 328A), $G_2$ may represent a second gradient texture map (e.g., the second gradient texture map 718B) corresponding to a second texture map (e.g., the second texture map 328B), $G_1(i, j)$ may represent a gradient value associated with the $(i, j)^{th}$ pixel of the first gradient texture map 718A, $G_2(i+1, j)$ may represent a gradient value associated with the $(i+1, j)^{th}$ pixel of the second gradient texture map 718B, $G_2(i, j+1)$ may represent a grayscale value associated with the $(i, j+1)^{th}$ pixel of the second gradient texture map 718B, and $E_g^h(i,j)$, $E_g^v(i,j)$ may represent the second energy values associated with the first texture map 328A and the second texture map 328B for a horizontal seam and a vertical seam, respectively.

Herein, the circuitry 202 may assign a large energy in case a magnitude of gradient value is large. This may ensure that the seam does not cross a region that includes an edge. By way of example, and not limitation, for the horizontal seam, a second energy value for the $(i, j-1)^{th}$ pixel of the first portion in the first texture map may be greater than a second energy value for $(i, j-1)^{th}$ pixel of the first portion (i.e., $E_g^h(i, j-1) > E_g^h(i, j)$). By way of example, and not limitation, for the vertical seam, a second energy value for the $(i-1, j)^{th}$ pixel of the first portion in the first texture map may be lesser than a second energy value for the $(i, j)^{th}$ pixel of the first portion (i.e., $E_g^v(i-1, j) < E_g^v(i, j)$).

At 722, confidence values for the set of texture maps may be determined. In an embodiment, the circuitry 202 may be configured to determine the confidence values for pixels of the generated set of texture maps (e.g., the texture maps 328A, 328B, and 328C) based on a determination of per-vertex confidence values. The circuitry 202 may determine the per-vertex confidence values for corresponding vertices of a refined 3D model (e.g., the refined 3D model 602). Each of the per-vertex confidence values (e.g., for the first vertex 602A) may be determined based on an angle between a first normal (e.g., the first normal 608B) to a reference image plane (e.g., the reference image plane 608A) and a second normal (e.g., the second normal 608C) to a respective vertex (i.e., the first vertex 602A) of the refined 3D model 602. In an embodiment, for a first pixel of one of the generated set of texture maps, the confidence values may include a first confidence value which may be determined based on a Barycentric interpolation of a set of per-vertex confidence values of the determined per-vertex confidence values. The set of per-vertex confidence values may correspond to vertices which may be neighboring to a first vertex associated with the first pixel. The determination of the confidence values for the pixels of each of the generated set of texture maps is described further, for example, in FIG. 6. Based on the determination of the confidence values for the pixels of the generated set of texture maps, the circuitry 202 may generate a corresponding set of confidence-value texture maps. As an example, the set of confidence-value texture maps associated with the generated set of texture maps may include a first confidence-value texture map 722A, a second confidence-value texture map 722B, and a third confidence-value texture map 722C corresponding to the first texture map 328A, the second texture map 328B, and the third texture map 328C, respectively.

At 724, a third energy associated with confidence values of the set of texture maps may be determined. In an embodiment, the circuitry 202 may be configured to determine the third energy associated with the confidence values of the set of texture maps (e.g., the texture maps 328A, 328B, and 328C) based on the corresponding set of confidence-value texture maps (e.g., the confidence-value texture maps 722A, 722B, and 722C). As described in aforementioned, for each pixel (i, j) in the final texture map, the circuitry 202 may estimate an energy value (represented as $E^h(i, j)$) for a possible horizontal seam and an energy value (represented as $E^v(i, j)$) for a possible vertical seam separately. For example, the third energy value associated with the confidence values of a first texture map and a second texture map of the set of texture maps for a horizontal seam and a vertical seam may be determined by use of equations (13) and (14), which may be given as follows:

$$E_w^h(i, j) = \frac{1}{(W_1(i, j)+\epsilon)^2} + \frac{1}{(W_2(i+1, j)+\epsilon)^2} \quad (13)$$

$$E_w^v(i, j) = \frac{1}{(W_1(i, j)+\epsilon)^2} + \frac{1}{(W_2(i, j+1)+\epsilon)^2} \quad (14)$$

where, $W_1$ may represent a first confidence-value texture map (e.g., the first confidence-value texture map 722A) corresponding to a first texture map (e.g., the first texture map 328A), $W_2$ may represent a second confidence-value texture map (e.g., the second confidence-value texture map 722B) corresponding to a second texture map (e.g., the second texture map 328B), $W_1(i, j)$ may represent a confidence value associated with the (i, j)$^{th}$ pixel of the first confidence-value texture map 722A, $W_2(i+1, j)$ may represent a confidence value associated with the (i+1, j)$^{th}$ pixel of the second confidence-value texture map 722B, $W_2(i, j+1)$ may represent a confidence value associated with the (i, j+1)$^{th}$ pixel of the second confidence-value texture map 722B, and $E_w^h(i,j)$, $E_w^h(i,j)$ may represent the third energy values associated with the first texture map 328A and the second texture map 328B for a horizontal seam and a vertical seam, respectively.

Herein, the circuitry 202 may assign a small energy in case a confidence value is large. The assignment of a small energy value to pixels with a large confidence value may ensure that such pixels are selected as seam positions along which texture maps may be stitched. The selection of such pixels as the seam positions may enhance the confidence values along the seam. By way of example, and not limitation, for the horizontal seam, a third energy value for the (i, j−1)$^{th}$ pixel of the first portion in the first texture map may be lesser than a third energy value for (i, j)$^{th}$ pixel of the first portion (i.e., $E_w^h(i, j-1) > E_w^h(i, j)$). By way of example, and not limitation, for the vertical seam, a third energy value for the (i−1, j)$^{th}$ pixel of the first portion in the first texture map may be greater than a third energy value for the (i, j)$^{th}$ pixel of the first portion (i.e., $E_w^v(i-1, j) > E_w^v(i, j)$).

At 726, an energy value may be estimated. In an embodiment, the circuitry 202 may be configured to estimate the energy value for each pixel of the final texture map based on respective portions of the generated set of texture maps (e.g., the texture maps 328A, 328B, and 328C) being stitched at a respective position of a respective pixel of the first texture map. In an embodiment, the estimated energy value may be a weighted sum of the first energy associated with grayscale values of the set of texture maps, the second energy associated with gradient values of the set of texture maps, and the third energy associated with confidence values for the set of texture maps. As previously described\, the energy values may be estimated separately for the horizontal seam and the vertical seam between the different texture maps to be stitched. The circuitry 202 may estimate the energy value for each pixel of the first texture map by use of equations (15) and (16), which may be given as follows:

$$E^h(i,j) = w_c E_c^h(i,j) + w_g E_g^h(i,j) + w_w E_w^h(i,j) \quad (15)$$

$$E^v(i,j) = w_c E_c^v(i,j) + w_g E_g^v(i,j) + w_w E_w^v(i,j) \quad (16)$$

where, $w_c$, $w_g$, $w_w$ may represent weights associated with the grayscale values, the gradient values, and the confidence values, respectively, and $E^h(i,j)$, $E^v(i,j)$ may represent the energy values for pixel (i,j) associated with a first texture map (e.g., the first texture map 328A) and a second texture map (e.g., the second texture map 328B) for a horizontal seam and a vertical seam, respectively.

Figure 8:
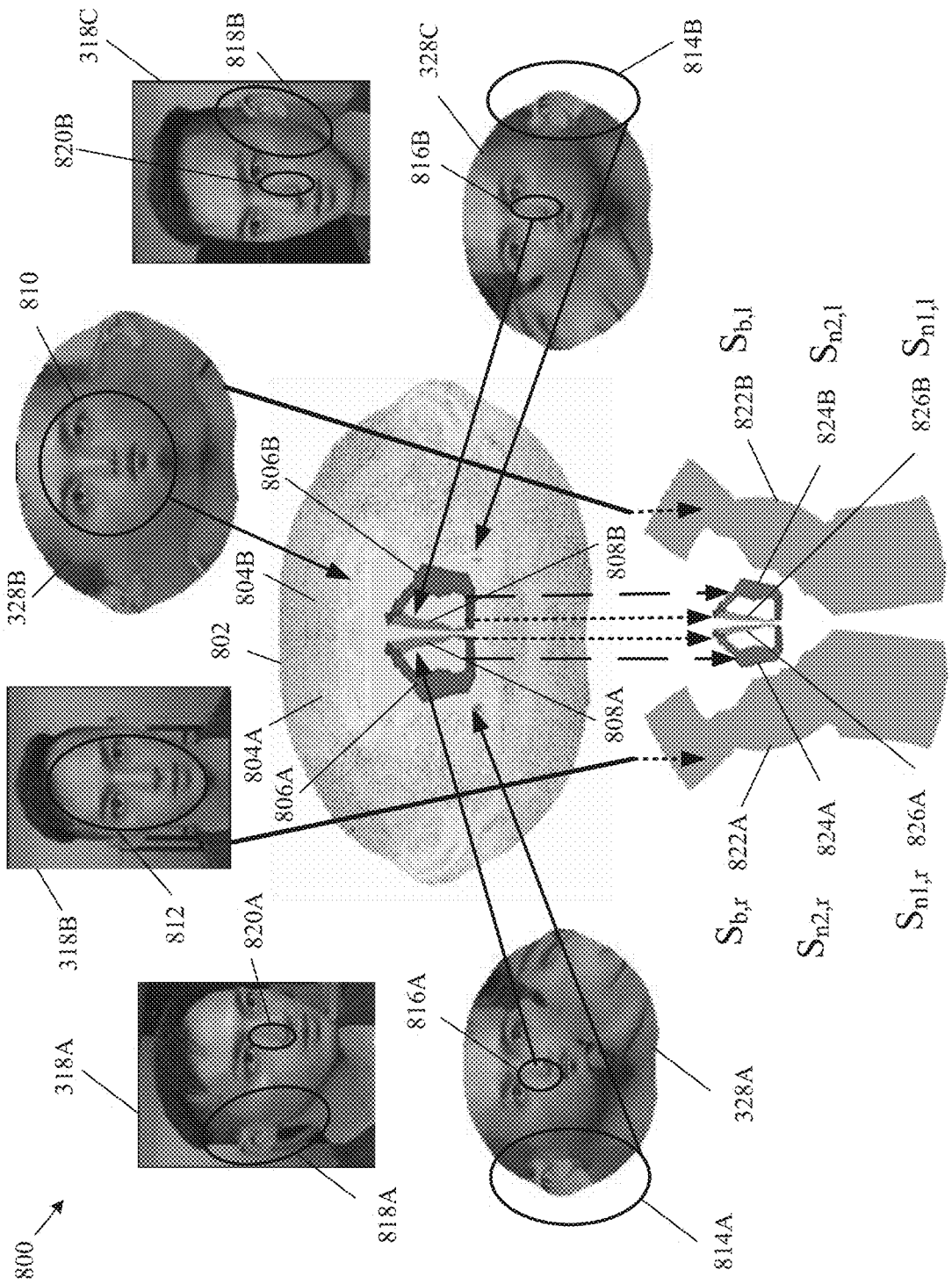
FIG. 8 is a diagram that illustrates an exemplary layout of a final texture map and a range of selection for each of a set of seams in the layout, in accordance with an embodiment of the disclosure.

FIG. 8 is a diagram that illustrates an exemplary layout of a final texture map and a range of selection for each of a set of seams in the layout, in accordance with an embodiment of the disclosure. FIG. 8 is described in conjunction with elements from FIGS. 1, 2, 3, 4A, 4B, 4C, 4D, 5A, 5B, 6, 7A, 7B, and 7C. With reference to FIG. 8, there is shown an exemplary diagram 800. The diagram 800 includes the first texture map 328A, the second texture map 328B, and the third texture map 328C from which a final texture map (e.g., the final texture map 330) may be generated. In FIG. 8, there is also shown the first color image 318A, the second color image 318B, and the third color image 318C. The diagram 800 further includes a layout 802 for the final texture map (e.g., the final texture map 330).

In an embodiment, the circuitry 202 may divide the layout 802 for the final texture map 330 into regions. Shown as an example, the layout 802 may be divided into a first set of regions 804A and 804B, a second set of regions 806A and 806B, and a third set of regions 808A and 808B. As shown, the first set of regions 804A and 804B of the layout 802 may be assigned texture information from a region 810 of the second texture map 328B. The region 810 of the second texture map 328B may correspond to a region 812 of the second color image 318B. The region 810 and the region 812 may correspond to facial regions of the subject's face 114 from a frontal viewpoint (i.e., the second viewpoint 116B). Further, the second set of regions 806A and 806B of the layout 802 may be assigned texture information from a region 814A of the first texture map 328A and a region 814B of the third texture map 328C, respectively. For example, the region 814A and the region 814B may correspond to a right ear region and a left ear region of the subject's face 114 from the first viewpoint 116A and the third viewpoint 116C, respectively. Similarly, the third set of regions 808A and 808B of the layout 802 may be assigned texture information from a region 816A of the first texture map 328A and a region 816B of the third texture map 328C, respectively. For example, the region 816A and the region 816B may correspond to a right nose region and a left nose region of the subject's face 114 from the first viewpoint 116A and the third viewpoint 116C, respectively.

In an embodiment, the circuitry 202 may be configured to determine a range of selection for each of the seams in the divided layout (such as the layout 802) based on a user input. The circuitry 202 may display the divided layout 802 on the display screen 206A. Based on the user input, the range of selection for each possible seam may be labeled. This may be done to avoid a large amount of calculation over the entire layout 802 of the final texture map 330. As shown, for example, ranges of selection may include a first set of ranges 822A and 822B (for seams $S_{b,r}$ and $S_{b,l}$) corresponding to the first set of regions 804A and 804B. These two seams ($S_{b,r}$ and $S_{b,l}$) decide the regions 804A and 804B, which may be cropped from side texture maps (such as the texture maps 328A and 328C generated from 2 side images for ear regions). The ranges of selection may further include a second set of ranges 824A and 824B (for seams $S_{n2,r}$ and $S_{n2,l}$) corresponding to the second set of regions 806A and 806B. Further, the ranges of selection may include a third set of ranges 826A and 826B (for seams $S_{n1,r}$ and $S_{n1,l}$) corresponding to the third set of regions 808A and 808B. The combination of $S_{n2,r}$ and $S_{n1,r}$ may be used to decide the region for the side of the nose (which may be selected from the third texture map 328C).

The dynamic programming workflow may be executed to determine each of the seams in the divided layout 802 by searching for, within a corresponding determined range of selection, each pixel of the final texture map for which the determined energy value is a minimum. The determination of the energy value is described further, for example, in FIGS. 7A, 7B, and 7C. The dynamic programming workflow for the determination of the seams is described further, for example, in FIGS. 9A, 9B, 9C, 9D, and 9E.

Figure 9A:
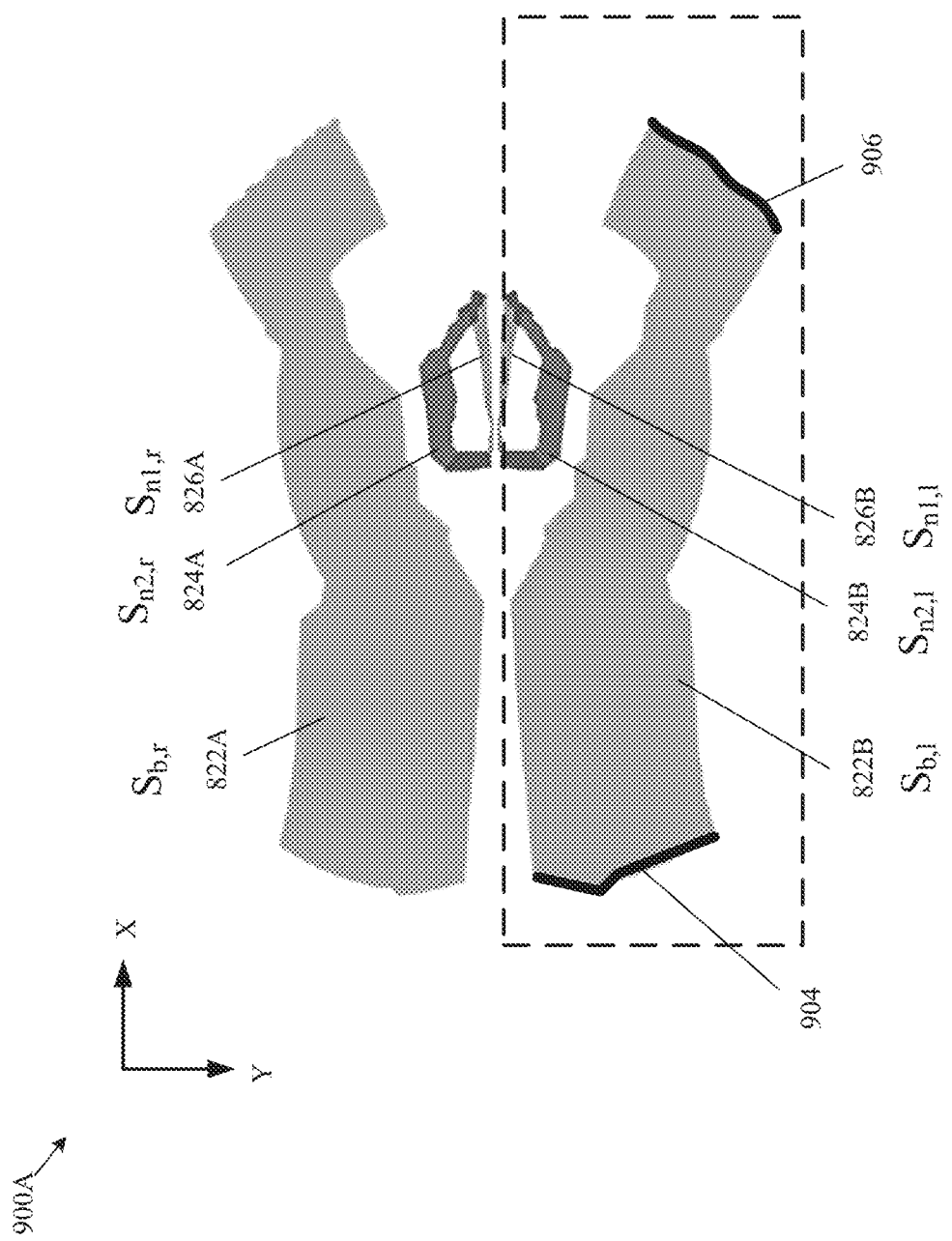
FIGS. 9A, 9B, 9C, 9D, and 9E are diagrams that collectively illustrate exemplary operations for determination of a set of seams by use of a dynamic programming workflow, in accordance with an embodiment of the disclosure.

FIGS. 9A, 9B, 9C, 9D, and 9E are diagrams that collectively illustrate exemplary operations for determination of a set of seams by use of a dynamic programming workflow, in accordance with an embodiment of the disclosure. FIGS. 9A, 9B, 9C, 9D, and 9E are described in conjunction with elements from FIGS. 1, 2, 3, 4A, 4B, 4C, 4D, 5A, 5B, 6, 7A, 7B, 7C, and 8. With reference to FIG. 9A, there is shown an exemplary diagram 900A. The diagram 900A may include the first set of ranges 822A and 822B (for seams $S_{b,r}$ and $S_{b,l}$) corresponding to the first set of regions 804A and 804B. These two seams ($S_{b,r}$ and $S_{b,l}$) decide the regions 804A and 804B, which may be cropped from the side texture maps (such as the texture maps 328A and 328C generated from 2 side images for ear regions). The diagram 900A may further include the second set of ranges 824A and 824B (for seams $S_{n2,r}$ and $S_{n2,l}$) corresponding to the second set of regions 806A and 806B. Further, the diagram 900A may include the third set of ranges 826A and 826B (for seams $S_{n1,r}$ and $S_{n1,l}$) corresponding to the third set of regions 808A and 808B. There is shown an X-axis direction and a Y-axis direction with respect to the different sets of ranges of selection for the seams $S_{b,r}$, $S_{b,l}$, $S_{n2,r}$, $S_{n2,l}$, $S_{n2,r}$, and $S_{n2,l}$. For the sake of brevity, FIG. 9A describes the determination of the seam $S_{b,l}$ from a range of selection 822B by use of dynamic programming. Other seams, such as $S_{b,r}$, $S_{n2,r}$, $S_{n2,l}$, $S_{n2,r}$, and $S_{n2,l}$ may be determined similarly from the respective ranges of selection by use of dynamic programming.

The diagram 900 depicts a portion 902 of the layout 802 that may include the range of selection 822B for a possible seam denoted by $S_{b,l}$. For the possible range of the seam $S_{b,l}$, the circuitry 202 may initialize two data structures, for example two tables. For example, the first table (referred to as a worktable) may store a minimum energy from a beginning to a current position in the range of selection 822B. Further, the second table (referred to as a path-table) may store a position of an iteration that precedes a current iteration to obtain a minimized energy for a current position in the range of selection 822B. The determination of the energy value is described further, for example, in FIGS. 7A, 7B, and 7C.

The circuitry 202 may label a list of possible start positions (e.g., a set of start positions 904) in the range of selection 822B based on a user-input. For each position (i, j) in the set of start positions 904, an initial value of the position in the worktable may be assigned as an energy value (i.e., $E^v(i, j)$) for a possible vertical seam at the pixel position (i, j). Further, an initial value of the position in the path-table may be labeled as "−1" that may denote a label for a start position in the path-table. In an embodiment, a set of start positions for the seams $S_{n2,r}$ and $S_{n2,l}$ may be assigned to be same as a set of start positions for the seams $S_{n1,r}$ and $S_{n1,l}$, respectively. In one embodiment, the seams $S_{n1,r}$ and $S_{n1,l}$ may be estimated before the seams $S_{n2,r}$ and $S_{n2,l}$, respectively. In another embodiment, the seams $S_{n2,r}$ and $S_{n2,l}$ may be estimated before the seams $S_{n1,r}$ and $S_{n1,l}$, respectively.

Figure 9B:
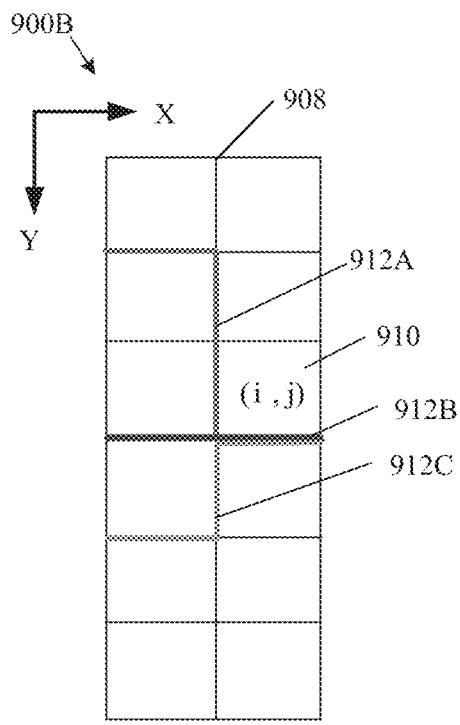

In FIG. 9B, there is shown a diagram 900B which includes possible seam positions for the final texture map. The diagram 900B includes a set of pixel positions 908 in the final texture map. In FIG. 9B, there is also shown an X-axis direction and a Y-axis direction with respect to the set of pixel positions 908 of the final texture map. The set of pixel positions 908 may include a first pixel 910 at a position (i, j) at which a seam in the final texture map may be determined from a set of possible seams, such as a first candidate seam 912A, a second candidate seam 912B, and a third candidate seam 912C. The circuitry 202 may determine a seam associated with the first pixel 910 at the position (i, j) based on energy values of the set of possible seams. A candidate seam from the set of possible seams may be selected based on the energy value of the candidate seam being minimum among the set of possible seams.

The circuitry 202 may execute the dynamic programming workflow to determine the seam $S_{b,l}$. In an embodiment, the dynamic programming workflow may be executed along the X-axis direction. For each step "j" of the dynamic programming workflow, values of the path-table and worktable for columns less than "j" may be filled. For example, the circuitry 202 may fill the worktable" and path-table by use of the equations (17) and (18), as follows:

$$\text{worktable}(i,j) = \min_{k \in range(j-1)} \text{worktable}(k,j-1) + E((k, j-1) \rightarrow (i,j)) \quad (17)$$

$$\text{pathtable}(i,j) = \text{argmin}_{k \in range(j-1)} \text{worktable}(k,j-1) + E((k,j-1) \rightarrow (i,j)) \quad (18)$$

Figure 9C:
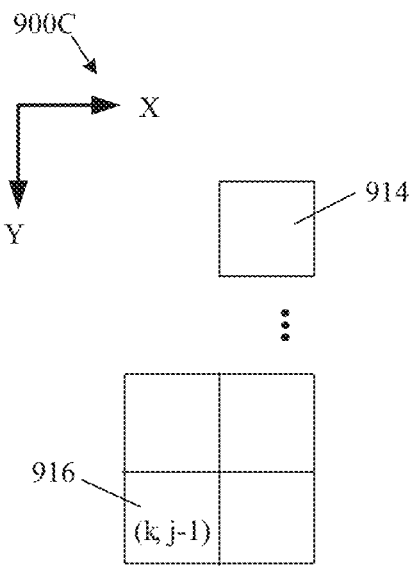
Figure 9D:
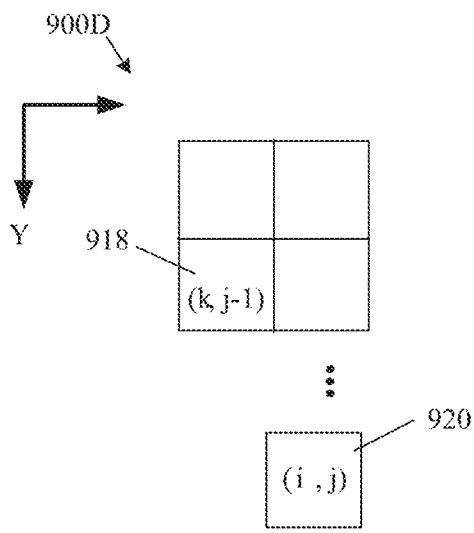
Figure 9E:
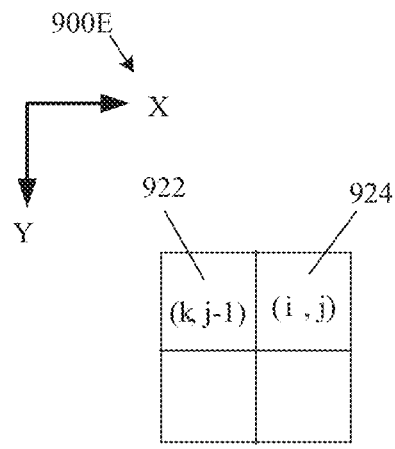

The calculation of the value of the term E((k, j−1)→(i, j)) is described further, for example, in FIGS. 9C, 9D, and 9E.

In FIG. 9C, there is shown a diagram 900C, which may be referred for calculation of the term E((k, j−1)→(i, j)) when the index "k" is greater than the index "i" for the X-axis component of pixel positions of the final texture map. In FIG. 9C, there is also shown an X-axis direction and a Y-axis direction with respect to a set of pixel positions of the final texture map. The diagram 900C illustrates pixel positions that may be traversed in different iterations of the dynamic programming workflow in case "k">"i". The pixel positions may include an initial pixel position (i. j) (denoted by 914) and a final pixel position (k, j−1) (denoted by 916). The circuitry 202 may determine the value for the term E((k, j−1)→(i, j)) by use of equation (19), as follows:

$$E((k, j-1) \rightarrow (i, j)) = \sum_{n=k}^{i+1} E^h(n, j-1) + E^v(i, j) \quad (19)$$

In FIG. 9D, there is shown a diagram 900D, which may be referred for calculation of the term E((k, j−1)→(i, j)) when the index "k" is less than the index "i" for the X-axis component of pixel positions of the final texture map. In FIG. 9D, there is also shown an X-axis direction and a Y-axis direction with respect to a set of pixel positions of the final texture map. The diagram 900D illustrates pixel positions that may be traversed in different iterations of the dynamic programming workflow in case "k"<"i". The pixel positions may include an initial pixel position (k, j−1) (denoted by 918) and a final pixel position (i, j) (denoted by 920). The circuitry 202 may determine the value for the term E((k, j−1)→(i, j)) by use of the equation (20), which may be given as follows:

$$E((k, j-1) \rightarrow (i, j)) = \sum_{n=k+1}^{i-1} E^h(n, j-1) + E^v(i, j) \quad (20)$$

In FIG. 9E, there is shown a diagram 900E, which may be referred for calculation of the term E((k, j−1)→(i, j)) when the index "k" is equal to the index "i" for the x-axis component of pixel positions of the final texture map. In FIG. 9E, there is also shown an X-axis direction and a Y-axis direction with respect to a set of pixel positions of the final texture map. The diagram 900E illustrates pixel positions that may be traversed in different iterations of the dynamic programming workflow in case "k"="i". The pixel positions may include a first pixel position (k, j−1) (denoted by 922) and a second pixel position (i, j) (denoted by 924). The circuitry 202 may determine the value for the term E((k, j−1)→(i, j)) by use of equation (21), which may be given as follows:

$$E((k,j-1) \rightarrow (i,j)) = E^v(i,j) \quad (21)$$

In an embodiment, the circuitry 202 may label a list of possible end positions (e.g., a set of end positions 906) in the range of selection 822B based on an extent of the range of selection 822B in the layout 802. The circuitry 202 may select an end position for the seam $S_{b,l}$ as a pixel with a minimum value in the "worktable". The end position may be selected from the set of end positions 906 in the range of selection 822B of the seam $S_{b,l}$. In an embodiment, the set of end positions for the seams $S_{n2,r}$ and $S_{n2,l}$ may be assigned to be same as a set of end positions for the seams $S_{n1,r}$ and $S_{n1,l}$.

In an embodiment, the circuitry 202 may backtrack to a previous position in range of selection 822B for the seam $S_{b,l}$ according to the path-table. For example, if a pixel (i, j) is selected, the previous position of the pixel may be "[path-table(i, j), j−1]". In case the difference between "i" and "path-table(i, j)" is larger than "1", the circuitry 202 may add pixels between "i" and "path-table(i, j)" to the seam $S_{b,l}$. The circuitry 202 may continue the execution of the backtrack until the tracked value of the "path-table" is "−1". Once the tracked value of the "path-table" is determined as "−1", the dynamic programming workflow may conclude for the seam. The pixel positions found based on the backtrack may be used as indices of the seam to stitch the respective portions of the two texture maps.

Figure 10:
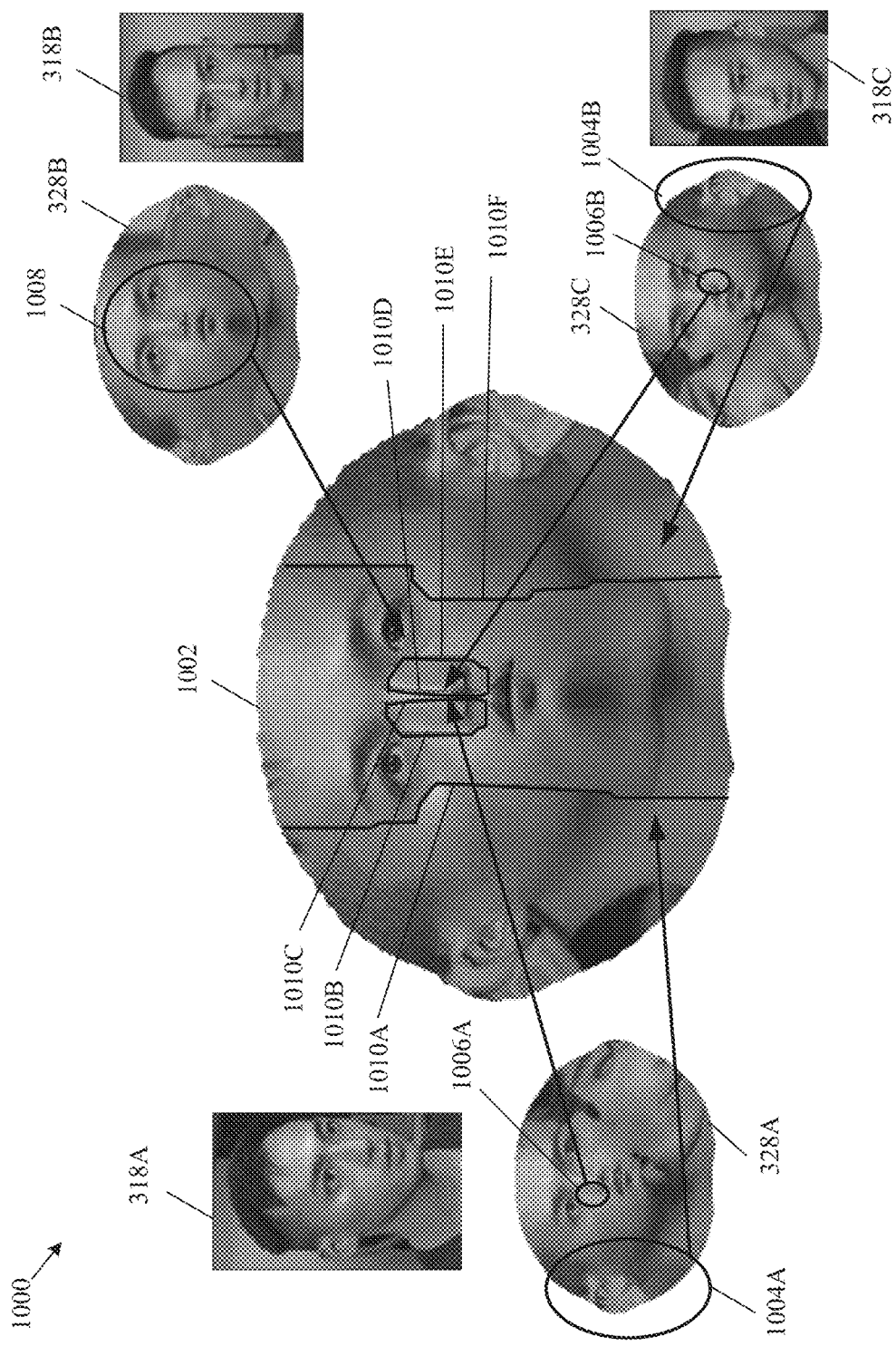
FIG. 10 is a diagram that illustrates exemplary operations to obtain a final texture map of a face of a subject, in accordance with an embodiment of the disclosure.

FIG. 10 is a diagram that illustrates exemplary operations to obtain a final texture map of a face of a subject, in accordance with an embodiment of the disclosure. FIG. 10 is described in conjunction with elements from FIGS. 1, 2, 3, 4A, 4B, 4C, 4D, 5A, 5B, 6, 7A, 7B, 7C, 8, 9A, 9B, 9C, 9D, and 9E. With reference to FIG. 10, there is shown a diagram 1000. The diagram 1000 includes the first texture map 328A, the second texture map 328B, and the third texture map 328C from which a final texture map 1002 of the subject's face 114 may be generated. In FIG. 10, there is also shown the first color image 318A, the second color image 318B, and the third color image 318C. The first texture map 328A may include a first region 1004A of a right ear and a second region 1006A of a right nose. The second texture map 328B may include a first region 1008 of a frontal facial portion. The third texture map 328C may include a first region 1004B of a left ear and a second region 1006B of a left nose. Texture information associated with each of the regions 1004A, 1004B, 1006A, 1006B, and 1008 may be included in the generated final texture map 1002. The final texture map 1002 may include a set of seams 1010A, 1010B, 1010C, 1010D, 1010E, and 1010F.

As shown, the circuitry 202 may stitch the first region 1004A with the first region 1008 along the seam 1010A in the final texture map 1002. Further, the circuitry 202 may stitch the second region 1006A with the first region 1008 along the seams 1010B and 1010C in the final texture map 1002. Similarly, the first region 1004B may be stitched with the first region 1008 along the seam 1010F in the final texture map 1002. Further, the second region 1006B may be stitched with the first region 1008 along the seams 1010D and 1010E in the final texture map 1002. An exemplary layout of the final texture map 1002 and a range of selection for each of the set of seams 1010A, 1010B, 1010C, 1010D, 1010E, and 1010F is described further, for example, in FIG. 8. A dynamic programming workflow for the determination of the seams 1010A, 1010B, 1010C, 1010D, 1010E, and 1010F based on energy values is described further, for example, in FIGS. 9A, 9B, 9C, 9D, and 9E. The determination of an energy value is described further, for example, in FIGS. 7A, 7B, and 7C.

The use of dynamic programming workflow for the determination of the seams (for example, as described in FIGS. 9A, 9B, 9C, 9D, and 9E) may be less computationally expensive and may require lesser processing time than conventional methods of seam determination. Further, as the seam may be determined based on a minimum energy of pixels in the final texture map, the determined seam may be optimum in various aspects. For example, small values may be assigned to the first energy values associated with the grayscale values of the set of texture maps based on a closeness of grayscale values to each other. This may ensure that the seam does not cross a region with a large texture difference. Further, large values may be assigned to the second energy values associated with the gradient values of the set of texture maps based on a large magnitude of the gradient values. This may ensure that the seam does not cross a region including an edge. In addition, small values may be assigned to the third energy values associated with the confidence values of the set of texture maps based on large confidence values. This may ensure that pixels with a large confidence value may be selected from the respective portions of both the texture maps to be stitched. Furthermore, the two portions of the texture maps to be stitched may be alpha blended along the seam to ensure that the respective portions merge smoothly at the seam location in the final texture map.

Figure 11:
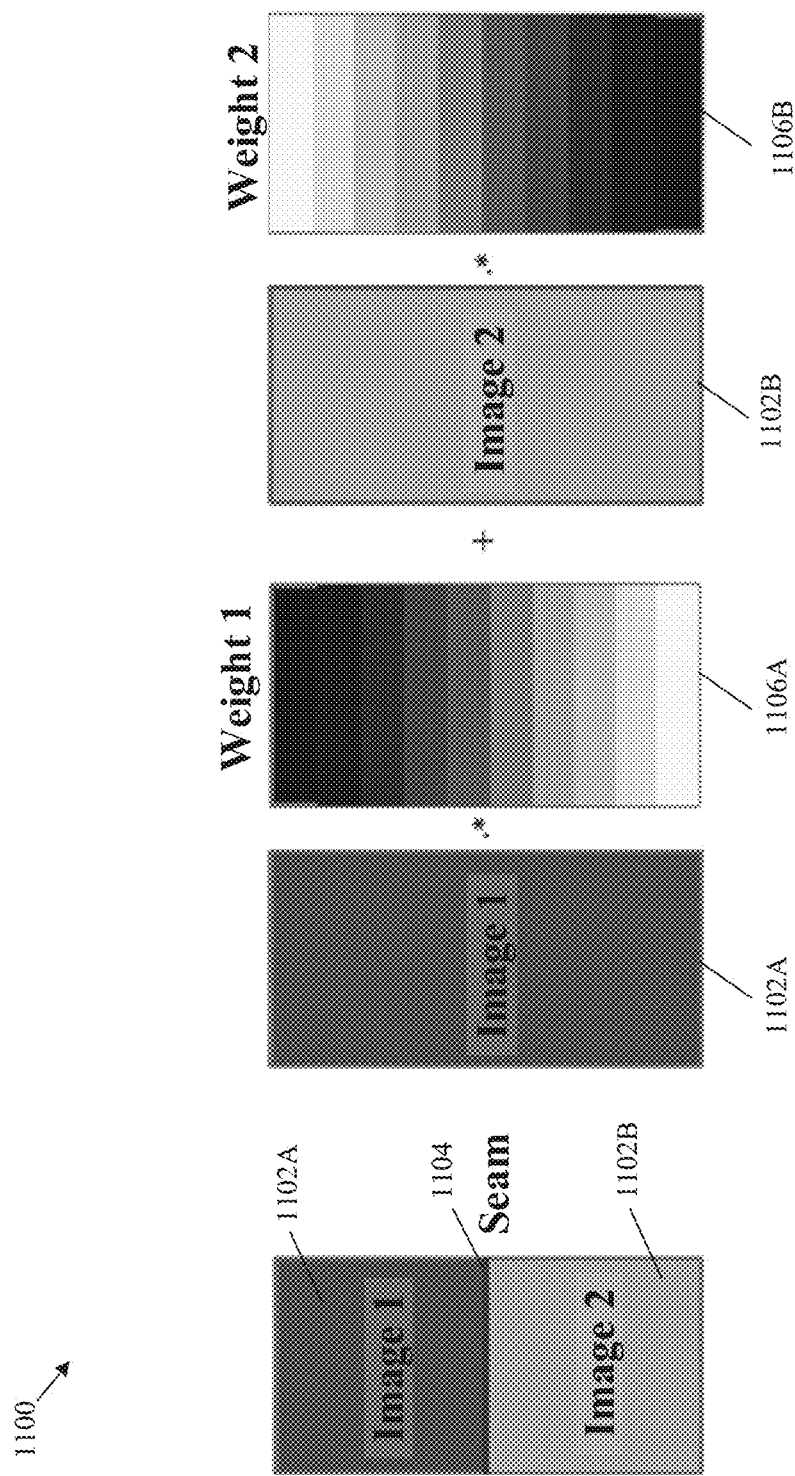
FIG. 11 is a diagram that illustrates an exemplary scenario of an alpha blending of two images along a seam between the two images, in accordance with an embodiment of the disclosure.

FIG. 11 is a diagram that illustrates an exemplary scenario of an alpha blending of two images along a seam between the two images, in accordance with an embodiment of the disclosure. FIG. 11 is described in conjunction with elements from FIGS. 1, 2, 3, 4A, 4B, 4C, 4D, 5A, 5B, 6, 7A, 7B, 7C, 8, 9A, 9B, 9C, 9D, 9E, and 10. With reference to FIG. 11, there is shown an exemplary scenario 1100. The scenario 1100 includes a first image 1102A (e.g., Image 1), a second image 1102B (e.g., Image 2), a seam 1104 between the first image 1102A and the second image 1102B, a first weight 1106A (e.g., Weight 1), and a second weight 1106B (e.g., Weight 2). In an embodiment, the first image 1102A may be a first portion of a first texture map and the second image 1102B may be a second portion of a second texture map. The seam 1104 may be formed between the first portion and the second portion. In an embodiment, the first weight 1106A and the second weight 1106B may each be images with a progressively variable transparency such that the first weight 1106A may be an inverse of the second weight 1106B. The first weight 1106A and the second weight 1106B may be chosen such that a transition between the two images at the seam 1104 becomes smooth after the execution of the alpha blending. The circuitry 202 may execute the alpha blending of the first portion and the second portion to stitch the portions along the seam 1104. To execute the alpha blending, the circuitry 202 may multiply the first weight 1106A with the first image 1102A, multiply the second weight 1106B with the second image 1102B and add the two product terms, as shown in FIG. 11. It should be noted that the scenario 1100 is for exemplary purpose and should not be construed as limiting for the present disclosure.

Figure 12:
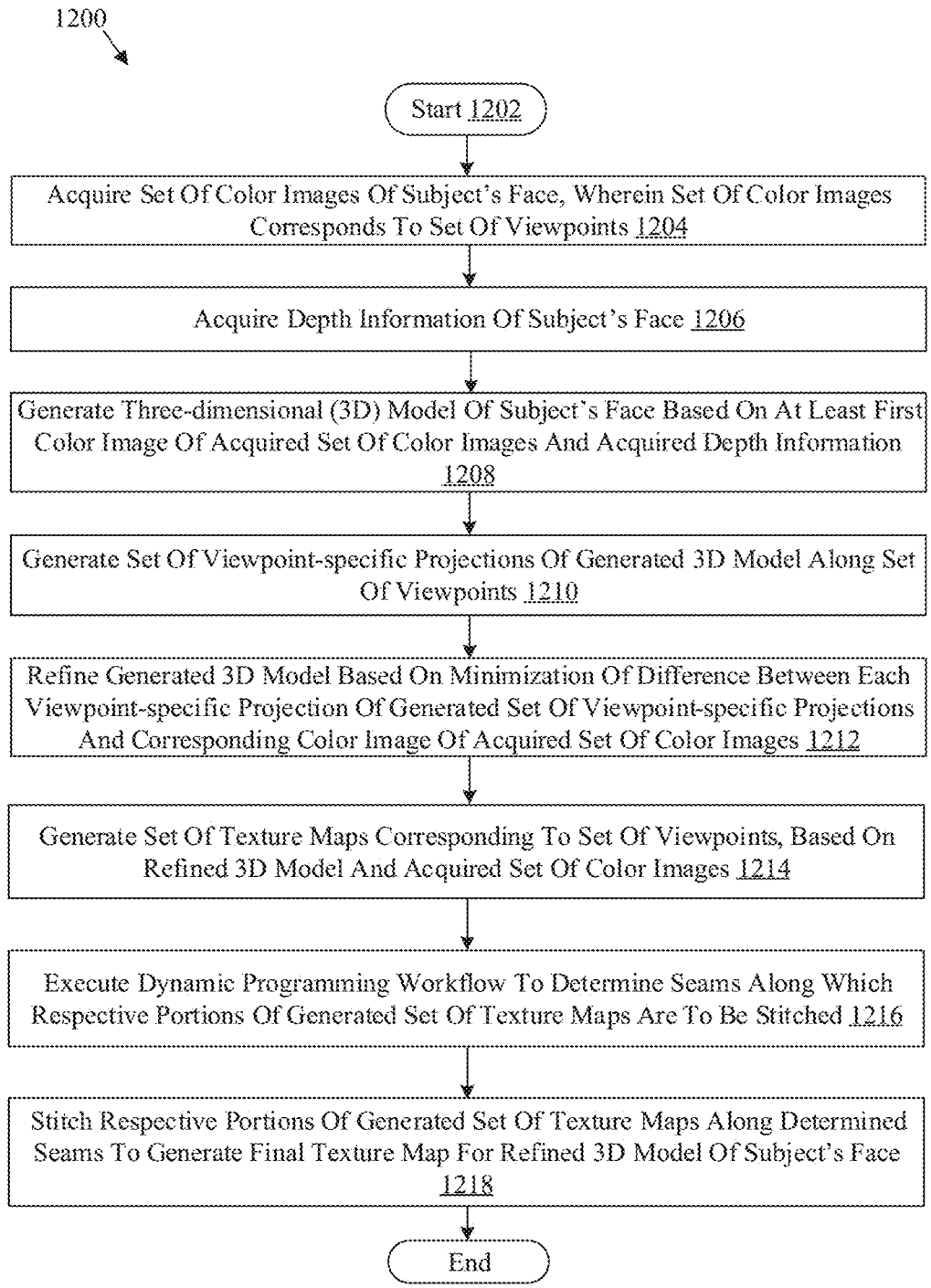
FIG. 12 is a flowchart that illustrates exemplary operations for texture map generation using multi-viewpoint color images, in accordance with an embodiment of the disclosure.

FIG. 12 is a flowchart that illustrates exemplary operations for texture map generation using multi-viewpoint color images, in accordance with an embodiment of the disclosure. FIG. 12 is described in conjunction with elements from FIGS. 1, 2, 3, 4A, 4B, 4C, 4D, 5A, 5B, 6, 7A, 7B, 7C, 8, 9A, 9B, 9C, 9D, 9E, 10, and 11. With reference to FIG. 12, there is shown a flowchart 1200. The flowchart 1200 may include operations from 1204 to 1218 and may be implemented on the electronic device 102. The flowchart 1200 may start at 1202 and proceed to 1204.

At 1204, the set of color images of the subject's face 114 may be acquired. In an embodiment, the circuitry 202 of the electronic device 102 may be configured to acquire the set of color images (e.g., the color images 318A, 318B, and 318C) of the subject's face 114. The set of color images (e.g., the color images 318A, 318B, and 318C) may correspond to the set of viewpoints (e.g., the viewpoints 116A, 116B, and 116C). In an embodiment, the image sensors 108A, 108B, 108C of the sensing device 106 may capture the color images 318A, 318B, and 318C of subject's face 114 from the viewpoints 116A, 116B, and 116C, respectively. The sensing device 106 may transmit the captured set of color images to the circuitry 202, via the communication network 112.

At 1206, the depth information (e.g., the depth information 320) of the subject's face 114 may be acquired. In an embodiment, the circuitry 202 may be configured to acquire the depth information 320 from the sensing device 106. In an embodiment, the depth sensor 110 may capture the depth information 320. In an embodiment, the depth information 320 may be acquired from a viewpoint which may be same as that of the second color image 318B. For example, the depth information 320 may be acquired from the second viewpoint 116B.

At 1208, the three-dimensional (3D) model of the subject's face 114 may be generated based on at least a first color image of the set of color images and the depth information 320. In an embodiment, the circuitry 202 may be configured to generate the 3D model (e.g., the 3D model 322) of the subject's face 114 based on at least the first color image of the set of color images and the depth information 320. For example, the first color image may correspond to a frontal viewpoint (e.g., the second viewpoint 116B) of the subject's face 114. The generation of the 3D model is described further, for example, in FIG. 3.

At 1210, the set of viewpoint-specific projections of the generated 3D model may be generated along the set of viewpoints. In an embodiment, the circuitry 202 may be configured to generate the set of viewpoint-specific projections of the generated 3D model (e.g., the 3D model 322) along the set of viewpoints. To generate each of the set of viewpoint-specific projections, the circuitry 202 may be configured to project the 3D model 322 onto a 2D image plane. The circuitry 202 may project the 3D model 322 on the 2D image plane along each of the set of viewpoints to generate the set of viewpoint-specific projections as respective perspective or orthographic projections of the 3D model 322. In an example, the circuitry 202 may project the 3D model 322 along the first viewpoint 116A to generate a first projection 324A. Further, the circuitry 202 may project the 3D model 322 along the second viewpoint 116B and the third viewpoint 116C to generate a second projection 324B and a third projection 324C, respectively. The generation of the set of viewpoint-specific projections is described further, for example, in FIG. 3.

At 1212, the generated 3D model (e.g., the 3D model 322) may be refined based on minimization of a difference between each viewpoint-specific projection of the generated set of viewpoint-specific projections and a corresponding color image of the acquired set of color images. In an embodiment, the circuitry 202 be configured to refine the generated 3D model 322 based on minimization of a difference between each viewpoint-specific projection of the generated set of viewpoint-specific projections and a corresponding color image of the acquired set of color images. In an embodiment, the refinement of the 3D model 322 may correspond to a 3D flow-based refinement. In an example, the circuitry 202 may refine the 3D model 322 to generate the refined 3D model 326. The refinement of generated 3D model is described further, for example, in FIGS. 3 and 4.

At 1214, the set of texture maps corresponding to the set of viewpoints may be generated based on the refined 3D model and the acquired set of color images. In an embodiment, the circuitry 202 may be configured to generate the set of texture maps corresponding to the set of viewpoints based on the refined 3D model 326 and the acquired set of color images (e.g., the color images 318A, 318B, and 318C). In an example, the circuitry 202 may generate a first texture map 328A corresponding to the first viewpoint 116A based on the refined 3D model 326 and the first color image 318A. Further, the circuitry 202 may generate a second texture map 328B corresponding to the second viewpoint 116B and a third texture map 328C corresponding to the third viewpoint 116C. The generation of the set of texture maps is described further, for example, in FIG. 3.

At 1216, the dynamic programming workflow may be executed to determine the set of seams along which respective portions of the generated set of texture maps are to be stitched. In an embodiment, the circuitry 202 may be configured to determine the set of seams. The circuitry 202 may execute the dynamic programming workflow to determine the set of seams along which respective portions of the generated set of texture maps (i.e., the texture maps 328A, 328B, and 328C) may be stitched. The circuitry 202 may be configured to divide a layout for the final texture map into regions. The circuitry 202 may be further configured to determine a range of selection for each of the seams in the divided layout based on a user input. In an embodiment, the dynamic programming workflow may be further executed to determine the seams in the divided layout by search for, within the determined range of selection, each pixel of the final texture map for which the determined energy value may be minimum. The determination of the seams is described further, for example, in FIGS. 8 and 9.

At 1218, the respective portions of the generated set of texture maps may be stitched along the determined seams to generate the final texture map for the refined 3D model of the subject's face 114. In an embodiment, the circuitry 202 may be configured to stitch the respective portions of the generated set of texture maps along the determined seams to generate the final texture map for the refined 3D model of the subject's face 114. For example, the respective portions of the generated texture maps (i.e., the texture maps 328A, 328B, and 328C) may be stitched along the determined seams to generate the final texture map for the refined 3D model 326 of the subject's face 114. In an example, the circuitry 202 may generate a final texture map 330 based on stitching along a first seam 332A, a second seam 332B, a third seam 332C, a fourth seam 332D, a fifth seam 332E, and a sixth seam 332F. In an embodiment, the respective portions of the generated set of texture maps (i.e., the texture maps 328A, 328B, and 328C) may be stitched based on an alpha blending of the respective portions along the determined set of seams. An example of the alpha blending is described further, for example, in FIG. 11. An example of the final texture map generated based on the stitching along the set of determined seams is described further, for example, in FIG. 10. Control may pass to the end.

Although the flowchart 1200 is illustrated as discrete operations, such as 1202, 1204, 1206, 1208, 1210, 1212, 1214, 1216 and 1218, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate an electronic device (for example, the electronic device 102). The instructions may cause the electronic device 102 to perform operations that include acquiring a set of color images (e.g., the color images 318A, 318B, and 318C) of a subject's face (e.g., the subject's face 114). The set of color images may correspond to a set of viewpoints (e.g., the viewpoints 116A, 116B, and 116C). The operations may further include acquiring depth information (e.g., the depth information 320) of the subject's face 114. The operations may further include generating a three-dimensional (3D) model (e.g., the 3D model 322) of the subject's face 114 based on at least a first color image (e.g., the second color image 318B) of the acquired set of color images and the acquired depth information 320. The operations may further include generating a set of viewpoint-specific projections (e.g., the projections 324A, 324B, and 324C) of the generated 3D model 322 along the set of viewpoints (e.g., the viewpoints 116A, 116B, and 116C). The operations may further include refining the generated 3D model 322 based on minimization of a difference between each viewpoint-specific projection of the generated set of viewpoint-specific projections (e.g., the projections 324A, 324B, and 324C) and a corresponding color image of the acquired set of color images (e.g., the color images 318A, 318B, and 318C). The operations may further include generating a set of texture maps (e.g., the texture maps 328A, 328B, and 328C) corresponding to the set of viewpoints (e.g., the viewpoints 116A, 116B, and 116C), based on the refined 3D model (e.g., the refined 3D model 326) and the acquired set of color images. The operations may further include executing a dynamic programming workflow to determine seams along which respective portions of the generated set of texture maps (e.g., the texture maps 328A, 328B, and 328C) may be stitched. The operations may further include stitching the respective portions of the generated set of texture maps (e.g., the texture maps 328A, 328B, and 328C) along the determined seams to generate a final texture map (e.g., the final texture map 330) for the refined 3D model 326 of the subject's face 114.

Exemplary aspects of the disclosure may provide an electronic device (such as, the electronic device 102 of FIG. 1) that includes circuitry (such as, the circuitry 202). The circuitry 202 may be configured to acquire a set of color images (e.g., the color images 318A, 318B, and 318C) of a subject's face (e.g., the subject's face 114). The set of color images may correspond to a set of viewpoints (e.g., the viewpoints 116A, 116B, and 116C). The circuitry 202 may be further configured to acquire depth information (e.g., the depth information 320) of the subject's face 114. The circuitry 202 may be further configured to generate a three-dimensional (3D) model (e.g., the 3D model 322) of the subject's face 114 based on at least a first color image (e.g., the second color image 318B) of the acquired set of color images and the acquired depth information 320. The circuitry 202 may be further configured to generate a set of viewpoint-specific projections (e.g., the projections 324A, 324B, and 324C) of the generated 3D model 322 along the set of viewpoints (e.g., the viewpoints 116A, 116B, and 116C). The circuitry 202 may be further configured to refine the generated 3D model 322 based on minimization of a difference between each viewpoint-specific projection of the generated set of viewpoint-specific projections (e.g., the projections 324A, 324B, and 324C) and a corresponding color image of the acquired set of color images (e.g., the color images 318A, 318B, and 318C). The circuitry 202 may be further configured to generate a set of texture maps (e.g., the texture maps 328A, 328B, and 328C) corresponding to the set of viewpoints (e.g., the viewpoints 116A, 116B, and 116C), based on the refined 3D model (e.g., the refined 3D model 326) and the acquired set of color images. The circuitry 202 may be further configured to execute a dynamic programming workflow to determine seams along which respective portions of the generated set of texture maps (e.g., the texture maps 328A, 328B, and 328C) may be stitched. The circuitry 202 may be further configured to stitch the respective portions of the generated set of texture maps (e.g., the texture maps 328A, 328B, and 328C) along the determined seams to generate a final texture map (e.g., the final texture map 330) for the refined 3D model 326 of the subject's face 114.

In an embodiment, the circuitry 202 may be further configured to determine an objective function for the refinement of the generated 3D model 322. The objective function may include a first term for the minimization of the difference between each viewpoint-specific projection of the generated set of viewpoint-specific projections (e.g., the projections 324A, 324B, and 324C) and the corresponding color image of the acquired set of color images (e.g., the color images 318A, 318B, and 318C). The objective function may further include a second term to minimize an offset between a set of landmark points on each viewpoint-specific projection of the generated set of viewpoint-specific projections (e.g., the projections 324A, 324B, and 324C) and a corresponding set of feature points on a corresponding color image of the acquired set of color images (e.g., the color images 318A, 318B, and 318C). The objective function may further include a third term for minimizing a sum of gradient magnitude of each component of a 3D flow term for each vertex of the generated 3D model 322. In an embodiment, the generated 3D model 322 may be refined based on a minimization of the determined objective function.

In an embodiment, the circuitry 202 may be further configured to acquire a plurality of pre-defined landmark points on the generated 3D model 322. The circuitry 202 may be configured to apply a landmark marching method on a subset of landmark points around a contour of the generated 3D model 322 to select the set of landmark points from among the acquired plurality of pre-defined landmark points. The subset of landmark points may be included in the acquired plurality of pre-defined landmark points, and each viewpoint-specific projection of the generated set of viewpoint-specific projections (e.g., the projections 324A, 324B, and 324C) may include the selected set of landmark points.

In an embodiment, the circuitry 202 may be further configured to estimate an energy value for each pixel of the final texture map 330. The respective portions of the generated set of texture maps (e.g., the texture maps 328A, 328B, and 328C) may be stitched at a respective position of a respective pixel of the final texture map 330. The estimated energy value may be a weighted sum of a first energy associated with grayscale values of the set of texture maps, a second energy associated with gradient values of the set of texture maps, and a third energy associated with confidence values for the set of texture maps.

In an embodiment, the circuitry 202 may be further configured to divide a layout (e.g., the layout 802) for the final texture map 330 into regions. The circuitry 202 may determine a range of selection for each of the seams in the divided layout based on a user input. The dynamic programming workflow may be further executed to determine the seams in the divided layout 802 by search for, within the determined range of selection, each pixel of the final texture map 330 for which the determined energy value may be minimum In an embodiment, the circuitry 202 may convert each of the generated set of texture maps (e.g., the texture maps 328A, 328B, and 328C) into a corresponding set of grayscale texture maps (e.g., the grayscale texture maps 714A, 714B, and 714C). The circuitry 202 may further determine the first energy associated with the grayscale values based on the corresponding set of grayscale texture maps (e.g., the grayscale texture maps 714A, 714B, and 714C).

In an embodiment, the circuitry 202 may apply a gradient filter over each of the generated set of texture maps (e.g., the texture maps 328A, 328B, and 328C) to generate a corresponding set of gradient texture maps (e.g., the gradient texture maps 718A, 718B, and 718C). The circuitry 202 may determine the second energy associated with the gradient values based on the corresponding set of gradient texture maps (e.g., the grayscale texture maps 714A, 714B, and 714C).

In an embodiment, the circuitry 202 may determine per-vertex confidence values for corresponding vertices of the refined 3D model 326. Each of the per-vertex confidence values may be determined based on an angle between a first normal (e.g., the first normal 608B) to a reference image plane (e.g., the reference image plane 608A) and a second normal (e.g., the second normal 608C) to a respective vertex (e.g., the first vertex 602A) of the refined 3D model 326. The circuitry 202 may determine the confidence values for pixels of the generated set of texture maps (e.g., the texture maps 328A, 328B, and 328C) based on the determined per-vertex confidence values. In an embodiment, for a first pixel of one of the generated set of texture maps, the confidence values may include a first confidence value which may be determined based on a Barycentric interpolation of a set of per-vertex confidence values of the determined per-vertex confidence values. The set of per-vertex confidence values may correspond to vertices which may be neighboring to a first vertex associated with the first pixel.

In an embodiment, for each pixel of the final texture map, a respective seam of the determined seams may include a horizontal seam and a vertical seam.

In an embodiment, the respective portions of the generated set of texture maps (e.g., the texture maps 328A, 328B, and 328C) may be stitched based on an alpha blending of the respective portions along the determined seams.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
   acquire a set of color images of a subject's face, wherein the set of color images corresponds to a set of viewpoints;
   acquire depth information of the subject's face;
   generate a three-dimensional (3D) model of the subject's face based on at least a first color image of the acquired set of color images and the acquired depth information;
   generate a set of viewpoint-specific projections of the generated 3D model along the set of viewpoints;
   refine the generated 3D model based on minimization of a difference between each viewpoint-specific projection of the generated set of viewpoint-specific projections and a corresponding color image of the acquired set of color images;
   generate a set of texture maps corresponding to the set of viewpoints, based on the refined 3D model and the acquired set of color images;
   execute a dynamic programming workflow to determine seams along which respective portions of the generated set of texture maps are to be stitched;
   stitch the respective portions of the generated set of texture maps along the determined seams to generate a final texture map for the refined 3D model of the subject's face; and
   estimate an energy value for each pixel of the final texture map, wherein
   the respective portions of the generated set of texture maps are to be stitched at a respective position of a respective pixel of the final texture map, and
   the estimated energy value is a weighted sum of a first energy associated with grayscale values of the set of texture maps, a second energy associated with gradient values of the set of texture maps, and a third energy associated with confidence values for the set of texture maps.

2. The electronic device according to claim 1, wherein the circuitry is further configured to determine an objective function for the refinement of the generated 3D model, wherein the objective function comprises:
   a first term for the minimization of the difference between each viewpoint-specific projection of the generated set of viewpoint-specific projections and the corresponding color image of the acquired set of color images, and
   a second term to minimize an offset between a set of landmark points on each viewpoint-specific projection of the generated set of viewpoint-specific projections and a corresponding set of feature points on a corresponding color image of the acquired set of color images.

3. The electronic device according to claim 2, wherein the objective function further comprises a third term for minimizing a sum of gradient magnitude of each component of a 3D flow term for each vertex of the generated 3D model.

4. The electronic device according to claim 2, wherein the generated 3D model is refined based on a minimization of the determined objective function.

5. A method, comprising:
   in an electronic device:
   acquiring a set of color images of a subject's face, wherein the set of color images corresponds to a set of viewpoints;
   acquiring depth information of the subject's face;
   generating a three-dimensional (3D) model of the subject's face based on at least a first color image of the acquired set of color images and the acquired depth information;
   generating a set of viewpoint-specific projections of the generated 3D model along the set of viewpoints;
   refining the generated 3D model based on minimization of a difference between each viewpoint-specific projection of the generated set of viewpoint-specific projections and a corresponding color image of the acquired set of color images;
   generating a set of texture maps corresponding to the set of viewpoints, based on the refined 3D model and the acquired set of color images;
   executing a dynamic programming workflow to determine seams along which respective portions of the generated set of texture maps are to be stitched;
   stitching the respective portions of the generated set of texture maps along the determined seams to generate a final texture map for the refined 3D model of the subject's face; and
   estimating an energy value for each pixel of the final texture map, wherein
   the respective portions of the generated set of texture maps are to be stitched at a respective position of a respective pixel of the final texture map, and
   the estimated energy value is a weighted sum of a first energy associated with grayscale values of the set of texture maps, a second energy associated with gradient values of the set of texture maps, and a third energy associated with confidence values for the set of texture maps.

6. The electronic device according to claim 1, wherein the circuitry is further configured to:
   acquire a plurality of pre-defined landmark points on the generated 3D model; and
   apply a landmark marching method on a subset of landmark points around a contour of the generated 3D model to select a set of landmark points from among the acquired plurality of pre-defined landmark points, wherein
   the subset of landmark points is included in the acquired plurality of pre-defined landmark points, and
   each viewpoint-specific projection of the generated set of viewpoint-specific projections comprises the selected set of landmark points.

7. The electronic device according to claim 1, wherein the circuitry is further configured to:
   divide a layout for the final texture map into regions; and
   determine a range of selection for each of the seams in the divided layout based on a user input, wherein
   the dynamic programming workflow is further executed to determine the seams in the divided layout by searching for, within the determined range of selection, each pixel of the final texture map for which the estimated energy value is a minimum.

8. The electronic device according to claim 1, wherein the circuitry is further configured to:
convert each of the generated set of texture maps into a corresponding set of grayscale texture maps; and
determine the first energy associated with the grayscale values based on the corresponding set of grayscale texture maps.

9. The electronic device according to claim 1, wherein the circuitry is further configured to:
apply a gradient filter over each of the generated set of texture maps to generate a corresponding set of gradient texture maps; and
determine the second energy associated with the gradient values based on the corresponding set of gradient texture maps.

10. The electronic device according to claim 1, wherein the circuitry is further configured to:
determine per-vertex confidence values for corresponding vertices of the refined 3D model, wherein
each of the per-vertex confidence values is determined based on an angle between a first normal to a reference image plane and a second normal to a respective vertex of the refined 3D model; and
determine the confidence values for pixels of the generated set of texture maps based on the determined per-vertex confidence values.

11. The electronic device according to claim 10, wherein for a first pixel of one of the generated set of texture maps,
the confidence values comprise a first confidence value which is determined based on a Barycentric interpolation of a set of per-vertex confidence values of the determined per-vertex confidence values, and
the set of per-vertex confidence values correspond to vertices which are neighboring to a first vertex associated with the first pixel.

12. The electronic device according to claim 1, wherein, for each pixel of the final texture map, a respective seam of the determined seams includes a horizontal seam and a vertical seam.

13. The electronic device according to claim 1, wherein the respective portions of the generated set of texture maps are stitched based on an alpha blending of the respective portions along the determined seams.

14. The method according to claim 5, further comprising:
dividing a layout for the final texture map into regions; and
determining a range of selection for each of the seams in the divided layout based on a user input, wherein
the dynamic programming workflow is further executed to determine the seams in the divided layout by searching for, within the determined range of selection, each pixel of the final texture map for which the estimated energy value is a minimum.

15. The method according to claim 5, further comprising determining an objective function for the refinement of the generated 3D model, wherein the objective function comprises:

a first term for the minimization of the difference between each viewpoint-specific projection of the generated set of viewpoint-specific projections and the corresponding color image of the acquired set of color images, and
a second term to minimize an offset between a set of landmark points on each viewpoint-specific projection of the generated set of viewpoint-specific projections and a corresponding set of feature points on a corresponding color image of the acquired set of color images.

16. The method according to claim 15, wherein the objective function further comprises a third term for minimizing a sum of gradient magnitude of each component of a 3D flow term for each vertex of the generated 3D model.

17. The method according to claim 15, wherein the generated 3D model is refined based on a minimization of the determined objective function.

18. A non-transitory computer-readable medium having stored thereon, computer-executable instructions that when executed by an electronic device, causes the electronic device to execute operations, the operations comprising:
acquiring a set of color images of a subject's face, wherein the set of color images corresponds to a set of viewpoints;
acquiring depth information of the subject's face;
generating a three-dimensional (3D) model of the subject's face based on at least a first color image of the acquired set of color images and the acquired depth information;
generating a set of viewpoint-specific projections of the generated 3D model along the set of viewpoints;
refining the generated 3D model based on minimization of a difference between each viewpoint-specific projection of the generated set of viewpoint-specific projections and a corresponding color image of the acquired set of color images;
generating a set of texture maps corresponding to the set of viewpoints, based on the refined 3D model and the acquired set of color images;
executing a dynamic programming workflow to determine seams along which respective portions of the generated set of texture maps are to be stitched;
stitching the respective portions of the generated set of texture maps along the determined seams to generate a final texture map for the refined 3D model of the subject's face; and
estimating an energy value for each pixel of the final texture map, wherein
the respective portions of the generated set of texture maps are to be stitched at a respective position of a respective pixel of the final texture map, and
the estimated energy value is a weighted sum of a first energy associated with grayscale values of the set of texture maps, a second energy associated with gradient values of the set of texture maps, and a third energy associated with confidence values for the set of texture maps.

* * * * *